US012242629B2

(12) United States Patent
Jadhav et al.

(10) Patent No.: US 12,242,629 B2
(45) Date of Patent: Mar. 4, 2025

(54) COMPUTER-IMPLEMENTED SYSTEM AND METHOD FOR PERFORMING IN-KERNEL INSTRUMENTATION OF KERNEL-LEVEL EVENTS

(71) Applicant: ACCUKNOX, INC., Cupertino, CA (US)

(72) Inventors: Rahul Arvind Jadhav, Bangalore (IN); Jaehyun Nam, Goyang-si (KR); Seungsoo Lee, Dong-Gu (KR)

(*) Notice: Subject to any disclaimer, the term of this patent is extended or adjusted under 35 U.S.C. 154(b) by 130 days.

(21) Appl. No.: 17/941,938

(22) Filed: Sep. 9, 2022

(65) Prior Publication Data

US 2024/0086558 A1  Mar. 14, 2024

(51) Int. Cl.
*G06F 21/62* (2013.01)

(52) U.S. Cl.
CPC .................. *G06F 21/6218* (2013.01)

(58) Field of Classification Search
None
See application file for complete search history.

(56) References Cited

U.S. PATENT DOCUMENTS

2016/0314312 A1* 10/2016 Asada ............... G06F 21/55

* cited by examiner

*Primary Examiner* — Cai Y Chen
(74) *Attorney, Agent, or Firm* — Joy S Goudie

(57) ABSTRACT

A computer-implemented system, computer-implemented method, and computer program product for facilitating in-kernel instrumentation of kernel-level processes are envisaged. The system, method, and computer program product implement the in-kernel instrumentation independent of the user space and without sharing any kernel-level processes-related information with the user space. A plurality of predetermined, customized eBPF maps are created and used to store information directed to kernel-level processes, including process ID, process namespace ID, process context, process parameters, and pointers directed to kernel-executable instrumentation-related directives. The information directed to kernel-level processes and kernel-executable instrumentation directives, both stored within the kernel space in a plurality of interlinked eBPF maps, are compared with one another, and subsequent to a successful comparison, the kernel-level processes are instrumented within the kernel space and entirely within the kernel-level, without any reliance on the user-level for performing such a comparison, and without having to facilitate context-switches between the user-level and kernel-level.

12 Claims, 3 Drawing Sheets

Figure 1:
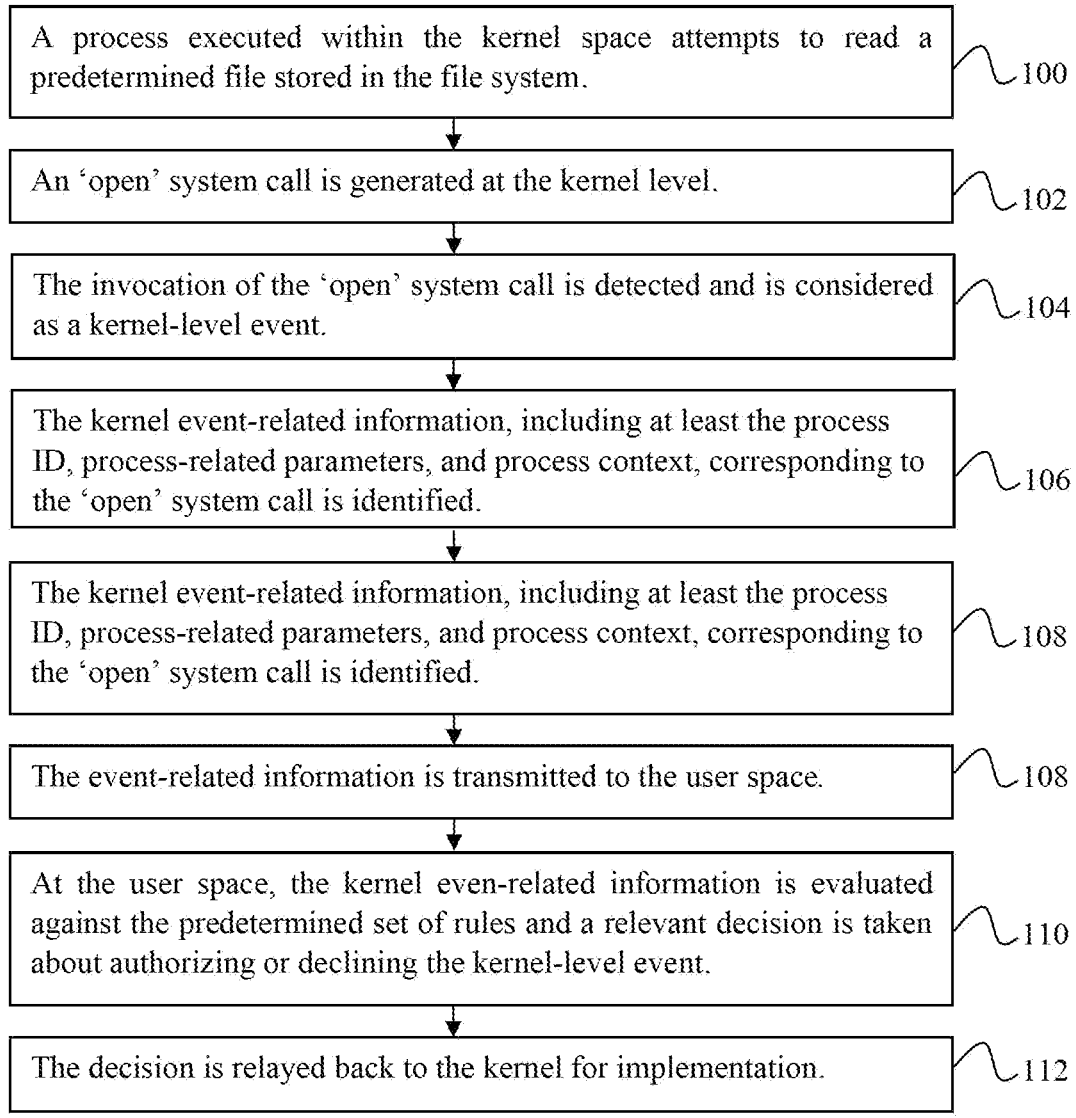

COMPUTER-IMPLEMENTED SYSTEM AND METHOD FOR PERFORMING IN-KERNEL INSTRUMENTATION OF KERNEL-LEVEL EVENTS

CROSS-REFERENCE TO RELATED APPLICATION

This application claims the priority and the continuation of the Provisional Patent Application Ser. No. 63/242,452 filed at USPTO on Sep. 9, 2021, with the title, "IN-KERNEL EVENT AUDITOR", and the contents of which are incorporated in its entirety.

BACKGROUND

Technical Field

The present disclosure relates to computer-implemented tools that facilitate an audit of kernel-level events, including kernel system calls and consequential detection of anomalies in the kernel. Particularly, the present disclosure relates to computer-implemented tools that instrument the kernel-level events independent of the user space. More particularly, the present disclosure relates to computer-implemented tools configured to be executed with minimal memory overheads and processing-related overheads.

Description of the Related Art

With the usage of the Internet increasing by leaps and bounds, and with the Internet and the use thereof forming a significant portion of our day-to-day computer-based activities, data security and data misuse-related problems caused by malware programs—malicious software codes that manipulate and steal confidential information—to the execution of such computer-based activities have also proportionately compounded. Malware programs typically steal and destroy computer system-related resources, including data and private information stored on computer system-related resources. Institutions heavily dependent on such computer system-related resources for storage, processing, and safe retrieval of confidential, sensitive information invest vast amounts of money and resources in preventing malware attacks that, if left to thrive, are bound to cause significant disruptions to the day-to-day functioning, product delivery, service orchestration inter-alia, and, in turn, profitability of such institutions.

The problems caused by malware programs are so enormous that they are often equated to cyber terrorism. Typically, malware exhibits multiple forms, including computer viruses, rootkits, trojan horses, spyware, and adware. Typically, malware programs are clandestine in nature and are enabled to typically provide administrator-level access to computer systems while actively hiding their presence from various system processes executed on computer systems and the users thereof. Typically, certain malware programs are programmed to attack computer systems by intruding and maintaining, clandestinely, command and control over such computer systems, facilitating remote execution of programs/processes, altering underlying system configurations, altering log files, and spying on and eliciting data corresponding to the legitimate use of the computer systems, all the while keeping the legitimate users of such computer systems in the dark about such attacks.

A rootkit is a common malware program that provides a malicious user with clandestine administrator-level access to a computer system by surreptitiously installing a computer program that masquerades as an administer, listens for commands from remote users, and executes a variety of operations on the computer system, both at the user-level as well as the kernel-level. Typically, rootkits executed at the kernel-level are considered to be comparatively more clandestine and dangerous than their user-level counterparts, for such kernel-level rootkits are typically programmed to evade traditional mechanisms of malware detection, including analysis of the process listing and identification of malware processes therefrom, identification of processes listening on strange sockets, and signature-file based differentiation of legitimate processes from malicious processes.

However, despite rootkits being programmed to evade such traditional mechanisms of malware detection, there exist certain rule-based event-monitoring tools that attempt to overcome the problems associated with traditional mechanisms of malware detection vis-à-vis the rootkits. Preferably, such rule-based event monitoring tools envisage maintaining a pre-defined process specification or a process set and parsing the process specification or the process set during the execution of individual processes to determine if any of those processes have not been pre-defined to be a part of the process specification or the process set. And, in an event any of the processes under execution have not been pre-defined in the process specification or the process set, then such a process is flagged off as exhibiting malicious behavior.

One of the commonly known rule-based even-monitoring tools is Falco™, which monitors kernel system calls and other kernel-level events to identify malicious behavior on the part of any processes invoking such kernel system calls and kernel-level events. Falco™ is a runtime rule-based security tool that parses system calls emanating from the kernel at run time, checks each such system call against a pre-defined set of rules that, if violated, signify malicious behavior, and generates signals indicative of the system call exhibiting malicious behavior. However, one of the drawbacks of Falco™ is that its implementation is heavily reliant on a computing system's user space, and that it has to be implemented entirely within the user-level of the computing system. For instance, in Falco™, a set of event-monitoring rules that differentiate between malicious processes and their legitimate counterparts are always executed in the user space, i.e., at the user-level. Further, in Falco™, the signals identifying a malicious process as well as the alerts signifying a malicious process are always generated and handled by the user space, thus necessitating context switch from the kernel space of the computing system to the user space every time a process is regarded as malicious in runtime.

Further, event-monitoring tools such as Falco™ are hard-coded to always use the process context before generating a signal indicative of a malicious process. That is, every time a process is executed, the set of rules pre-defined in Falco™ are always asserted against the context of the process under execution viz. name, process ID, namespace, and process path, before identifying the process as malicious or authentic. And therefore, it would be fair to suggest that the results derived by a rule-based event-monitoring tool such as Falco™ would always be dependent on how accurately the set of rules separate malicious processes from legitimate processes, how accurately the compliance standards are manifested into (event monitoring) rules, and the quantum of processing-related overheads created by the repetitive execution of such event monitoring rules. Further, since a rule-based event monitoring tool such as Falco™ always relies upon the user space for the execution of event monitoring rules and for generating signals indicative of malicious processes, the implementation of a tool such as Falco™ invariably entails frequent context switching from kernel space to the user space, which, in turn, creates huge processing-related overheads and memory management-related overheads that exhibit a negative effect on the overall performance of the computing system.

Further, rule-based event monitoring tools such as Falco™ are not equipped with rate limit-based filtering. That is, Falco™ does not facilitate the creation of a filter that could be invoked if a particular system event (such as a kernel system call) is detected more than 'ten' times per unit time. Further, rule-based event monitoring tools such as Falco™ are also not enabled to provide the option of applying temporal correlations-based event-monitoring rules. That is, in Falco™, a filter cannot be programmed to be automatically invoked when a write is invoked more than 'hundred' times in a minute and a corresponding 'read' event is invoked more than 'hundred' times per second.

And, even if it is hypothesized that a rule-based event monitoring tool such as Falco™ is indeed programmed to facilitate rate limit based filtering and temporal correlation-based filtering, for rate-limit based filtering and temporal filtering in a time-sensitive manner, Falco™ would have to induce frequent context switching, from kernel space to user space, for in the case of Falco™, the set of rules that differentiate between malicious processes and their legitimate counterparts, the signals identifying a malicious process, and the alerts that signify a malicious process are always generated and handled by the user space, i.e., at the user-level. And the induction of rate limit-based filtering and temporal-correlation based filtering into Falco™ would only exacerbate the already high processing-related overheads and memory management-related overheads, which are primarily caused by the frequent context-switching necessitated by Falco™.

Further, yet another drawback associated with conventional rule-based event monitoring tools such as Falco™ is the higher rate of false-positive alerts, especially in the context of native application program interfaces (APIs), since native APIs are extensively used in every computing system, and since monitoring of native APIs typically generated humungous amounts of event behavior-related data, which when not processed in a highly context-sensitive manner may lead to the generation of false-positive malicious behavior related alerts. And therefore, it is imperative that the data generated by monitoring of native API is analyzed in correlation with relevant contextual data, and there was felt a need for an improved event auditor that allowed for API monitoring-related data to be correlated in a context-sensitive manner with other relevant event behavior-related data and thereby brought about a significant decrease in the number of false-positive alarms generated during the monitoring of native APIs, There was also felt a need for an improved kernel-level event-monitoring system that facilitates the creation of rate limit-based filters and temporal correlation-based filters executable within the kernel—and not in the user space, as was the case with Falco™—and thereby minimizes the number of context-switches between the kernel space and the user space, and thus brings down the consequential memory overheads and in-kernel processing overheads to optimum and acceptable levels.

OBJECTS

An object of the present disclosure is to envisage a computer-implemented system, method, and computer program product that facilitate in-kernel instrumentation, audit, and monitoring of kernel-level events.

Yet another object of the present disclosure is to envisage a computer-implemented in-kernel event instrumentation and auditing tool that facilities temporal correlation in addition to spatial correlation.

Still, a further object of the present disclosure is to envisage a computer-implemented in-kernel event instrumentation and auditing tool that brings about a significant decrease in the memory processing-related overheads and in-kernel processing overheads.

One more object of the present disclosure is to envisage a computer-implemented in-kernel event instrumentation and auditing tool that significantly reduces the requirement for context switching between a computing system's user space and kernel space by facilitating in-kernel instrumentation, event-monitoring and event-auditing.

Still, a further object of the present disclosure is to envisage a computer-implemented in-kernel instrumentation and auditing tool that facilitates implementation of defense policies and rules that make the deployment of computing systems comparatively safer.

Yet another object of the present disclosure is to envisage a computer-implemented in-kernel event instrumentation and auditing tool that minimizes the occurrence of false-positive system intrusion alerts.

SUMMARY

The present disclosure envisages a computer-implemented system, computer-implemented method, and computer program product for facilitating in-kernel instrumentation and auditing of kernel-level processes or kernel-level events, including kernel system calls. Throughout the remainder of the present disclosure, the term kernel-level events and kernel-level processes are used synonymously and are thus interchangeable with one another. Throughout the remainder of the present disclosure, the terms kernel-level processes and kernel-level events refer to kernel system calls, unless specified otherwise. One embodiment of the present disclosure is directed to the computer-implemented system that includes a combination of a pre-configured computer-based processor and an extended Berkley Packet Filter (eBPF) kernel module. The computer-based processor and the eBPF kernel module, in combination, facilitate in-kernel instrumentation of kernel-level processes, including kernel system calls. The computer-based processor and the eBPF kernel module facilitate instrumentation of kernel-level processes entirely within the kernel space of the computer-implemented system and independent of the user space thereof. In accordance with the present disclosure, the eBPF kernel module creates a plurality of predetermined eBPF maps that store information directed to kernel-level processes, including process ID (PID), process namespace ID (PID_ns), process context, process-related parameters, and pointers directed to kernel-executable instrumentation-related directives.

In accordance with the present disclosure, since all the information directed to kernel-level processes and kernel-executable instrumentation directives is stored within the kernel space in a plurality of interlinked eBPF maps, the processor is enabled to initiate a comparison between kernel-level processes-related information and predefined instrumentation-related directives within the kernel-level itself, without having to rely on the user-level for performing such a comparison, and without having to facilitate context-switches between the user-level and kernel-level, which would have otherwise been necessary for enabling such a comparison within the user space (or the user-level). In accordance with the present disclosure, the rate limit-based rules and temporal correlations-based rules embodied within the predefined instrumentation-related directives are compared against the information directed to kernel-level processes stored within the eBPF maps, and the kernel-level processes are instrumented and audited within the kernel space and entirely at the kernel-level, therefore not necessitating any context-switches to the user space for facilitating the instrumentation and auditing of kernel-level processes.

Another embodiment of the present disclosure envisages the computer-implemented method configured, upon implementation by a computer-based system, to facilitate in-kernel instrumentation and auditing of kernel-level processes or events. The computer-implemented method (referred to as a method) begins with a computer-based processor programmatically dividing the virtual memory of the computer-based system into user space and kernel space. Subsequently, the method proceeds to create an eBPF kernel module that, in turn, creates a plurality of interlinked eBPF maps for storing the information corresponding to kernel-level events, including the process ID (PID), process namespace ID (PID_ns), process context, process parameters, and pointers pointing to pre-defined instrumentation-related directives. Subsequently, the information corresponding to kernel-level events is compared, within the kernel space and entirely at the kernel-level, with rules embodied within predetermined instrumentation-related directives, which, in the case of a successful comparison, are executed within the kernel space, thereby instrumenting the kernel-level processes entirely at the kernel space, without relying on the user space and thus minimizing the context-switching between the user space and the kernel space, at least within the context of instrumentation of kernel-level processes/kernel-level events. Another embodiment of the present disclosure is directed to the computer program product that can be implemented on a computer-based system to facilitate in-kernel instrumentation and auditing of kernel-level processes or kernel-level events thereon.

BRIEF DESCRIPTION OF THE ACCOMPANYING DRAWINGS

The other objects, features and advantages will be apparent to those skilled in the art from the following description and the accompanying drawings. In the accompanying drawings, like numerals are used to represent/designate the same components previously described.

Figure 2:
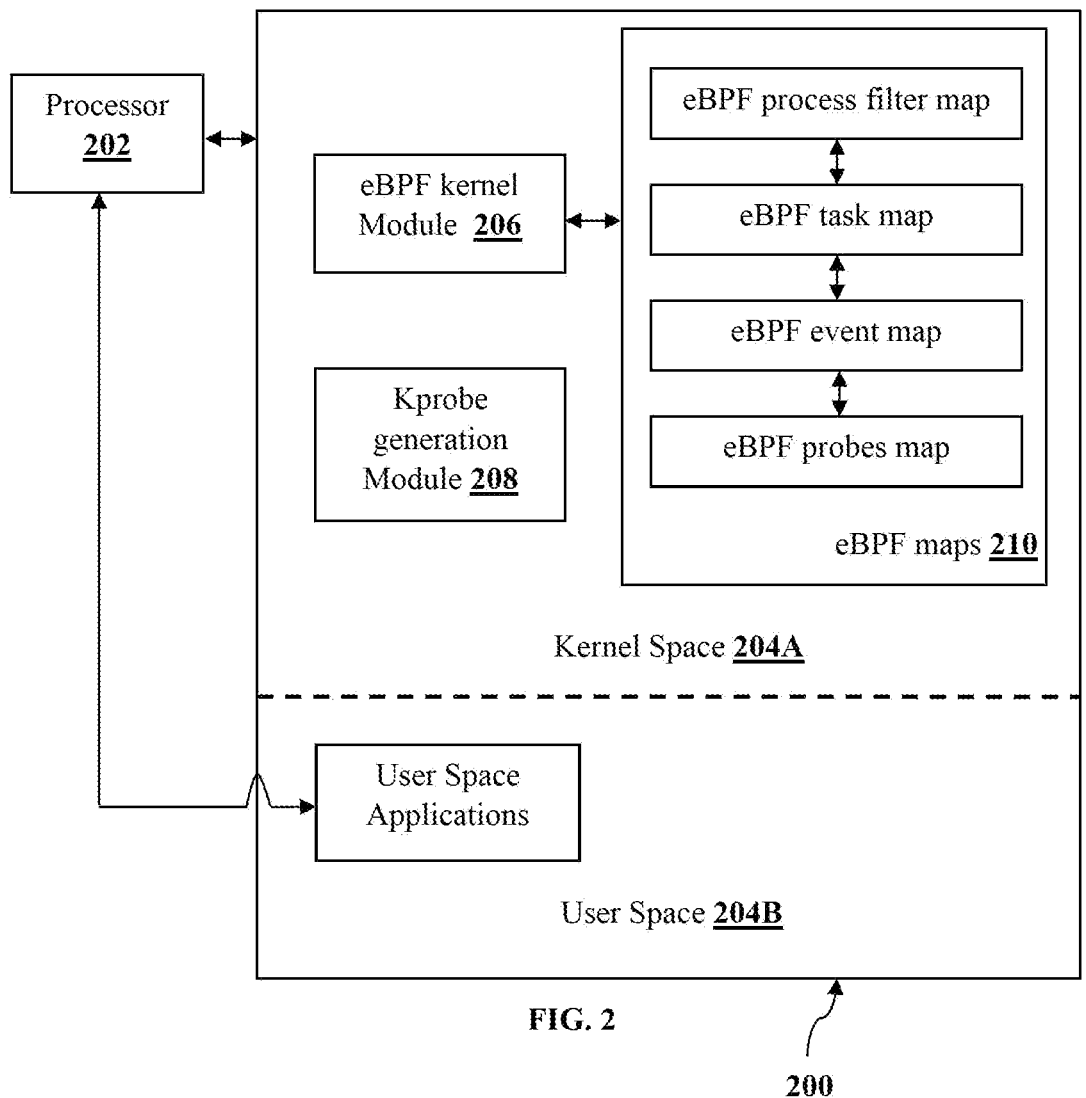
Figure 3:
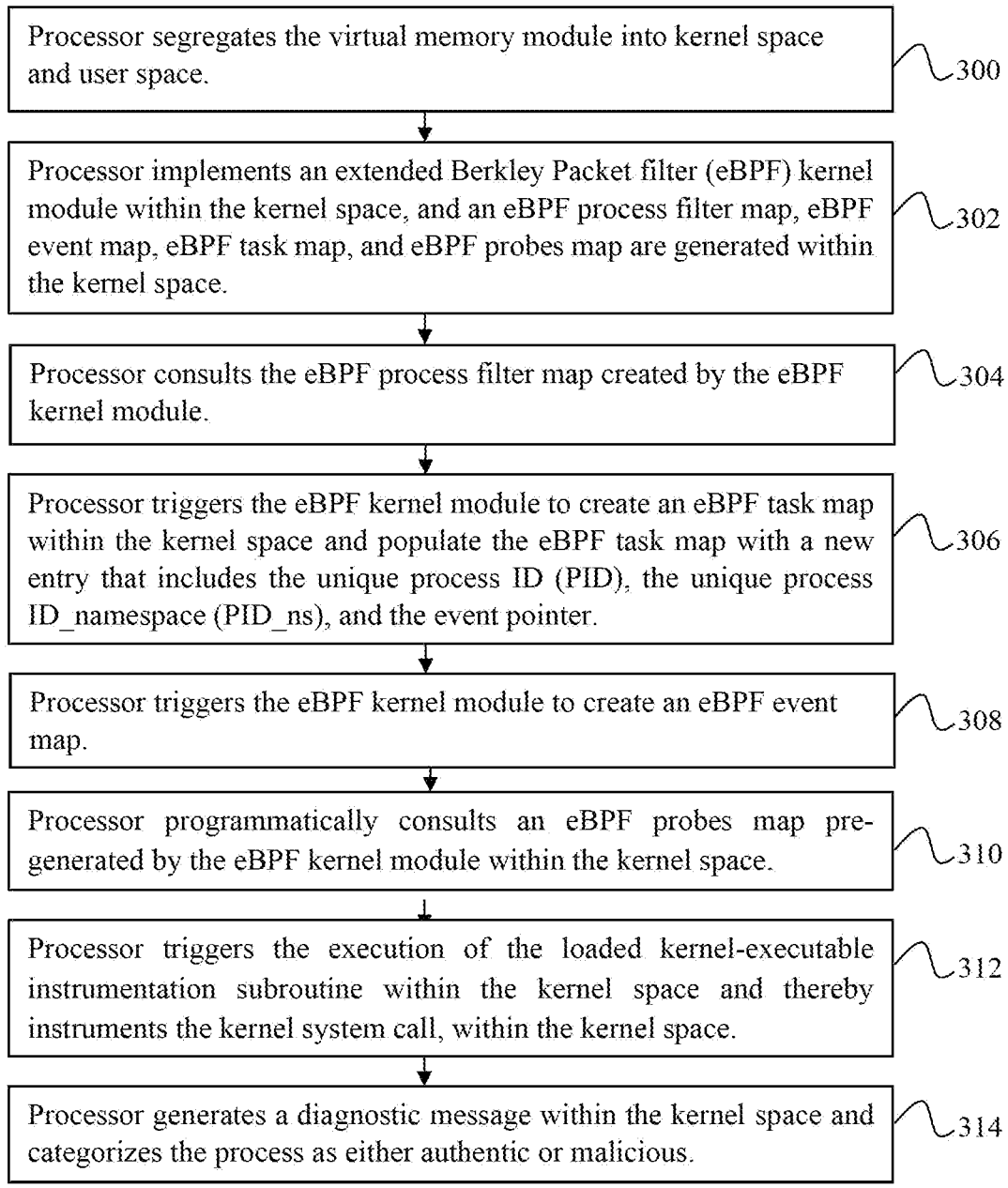

FIG. 1 is a flowchart illustrating a prior art procedure for instrumenting kernel-level events;

FIG. 2 is a block diagram illustrating the components of the computer-implemented system that facilitates in-kernel instrumentation of kernel-level events, in accordance with the present disclosure; and FIG. 3 is a flowchart illustrating the steps involved in the computer-implemented method for facilitating in-kernel instrumentation of kernel-level events, in accordance with the present disclosure.

DETAILED DESCRIPTION

The functioning of a typical computer-based system is managed by an operating system that, in turn, controls and manages the manner in which software applications executing on the computer-based system communicate with and utilize the system resources embodied within the computer-based system. Typical software applications executing on the computer-based system include text editors, web browsers, graphic tools, and programming languages, and the system resources embodied within the computer-based system include memory modules, input/output devices, central processing unit, network connections, input/output ports, interrupt request lines, direct memory access channels, and the like.

The operating system typically segregates the virtual memory of the computer-based system into user space and kernel space, with software applications, including text editors, web browsers, graphic tools, and programming languages, executed in the user space, and the operating system kernel, associated extensions and device drivers executed in the kernel space. The operating system kernel (referred to as 'kernel' hereafter) is a fundamental component of the operating system that acts as a bridge between the software applications and the system resources, and provides software applications with secured access to system resources in line with the access and security privileges assigned to the system resources. In a typical operating system environment, the kernel, associated kernel extensions and device drivers are provided with the highest hardware privilege and therefore an unhindered access to each of the system resources, whereas software applications executing in the user space are not enabled to directly access the system resources and will often have to rely on the kernel to access those system resources. Typically, software applications executing within the user space generate system calls and request the kernel to access the privileged system resources and perform the necessary computational task on their behalf.

In a typical operating system environment, a system call is issued by a software application (or a computer program) executing in the user space to request for a service from the kernel that is executed within the kernel space. The software application executing within the user space interacts with the kernel executing with the kernel space by way of system calls, which act as the only entry points to the kernel and the kernel space. Typically, any software application that needs to access a system resource to complete a given computational task generates a system call and thereby requests the kernel to access the necessary system resource from the kernel space, complete the pending computational task in the kernel space, and return the result of the computational task to the user space. Again, in a typical operating system environment, a system call may result in creation and execution of kernel-level events or kernel-level processes directed to inter-alia process control, file management, device management, information maintenance, and communication. In the context of the present disclosure, the term 'processes executed within said kernel space' refers to processes that enter the kernel space and invoke the kernel to perform certain computational procedures (for example, input/output operations, file read/write operations) on their behalf.

For instance, in accordance with the present disclosure, a particular process previously executed within the user space enters the kernel space and invokes the 'open' system call within the kernel space. And the kernel-level implementation of the 'open' system call results in the implementation of a kernel-level function that provides access to a file stored in the file system of the computer-based system. Likewise, the invocation of the 'read' system call within the kernel space results in the implementation of a kernel-level function that accesses data from a file stored in the file system.

Typically, the system call invoked from the kernel and the corresponding kernel-level functions are executed entirely within the kernel space.

In the context of the present disclosure, the invocation of a 'read' system call by a user space process (i.e., a process executing in the user space) triggers the kernel to execute a corresponding system call instruction. Subsequent to the execution of the system call instruction, the processor (that executes the kernel) initiates the execution of a corresponding system call handler within the kernel space and within the kernel protection domain, and calls the kernel-level function that implements the requested system call. The processor also maintains a table of the kernel-level functions executed for every system call. Typically, system calls are always executed with more privileges vis-a-vis user space process, for system calls are always executed within the kernel space and kernel protection domain, and with highest access privileges. Subsequent to the kernel-level function implementing the operations corresponding to the system call, the process control is returned to the system call handler and the execution of the user space process, that originally triggered the kernel to issue the 'read' system call, is resumed within the user space. In the context of the present disclosure, the invocation of the 'read' system call is considered a kernel-level event. Likewise, the execution of the 'read' system call, and the subsequent identification of the file to read from, and the subsequent identification of the buffer to store the read data are all performed by corresponding kernel-level functions and the invocation of such kernel-level functions is also represented by corresponding kernel-level events. Throughout the present disclosure, the term 'kernel-level process' and 'kernel-level functions' are used synonymously and interchangeably with one another. It is to be understood that both the terms refer to the execution of the kernel system call within the kernel space.

As is evident from the illustration provided in the 'background' section, well-known malware detection process/service Falco™ monitors kernel-level system calls and kernel-level events and processes the corresponding kernel-level system calls-related data and the kernel-level events-related data (referred to as 'kernel-level data' hereafter) at the user space against a pre-defined set of rules to identify any malicious behaviour on the part of the said kernel-level system calls and kernel-level events. However, one of the major drawbacks associated with Falco™ was that it was designed to derive the kernel-level information from the kernel space and process the derived kernel-level information at the user space, a resource intensive procedure that necessitated frequent context-switching between the user space and the kernel space, throughout the duration of the process of detection of malicious activities or agents within the kernel space. In the case of Falco™, one context-switching (from the kernel space to the user space) was necessary to process the kernel-level data transmitted from the kernel space, and another context switching (from the user space to the kernel space) was necessary to execute the decision taken based on the processing of the kernel-level data, at the kernel level. Therefore, in the case of Falco™, more the number of kernel-level system calls and kernel-level events, more would be the number of context-switches between the kernel space and user space and vice-versa, and more would be the quantum of computing resources and computing time necessary to detect the presence of malicious agents or malicious activities within the kernel space.

The fact that the implementation of Falco™ was restricted entirely to the user space and the fact that Falco™ utilized the user space to process kernel-level data and relied upon context-switching to process the kernel-level data and to implement the decisions derived based on the processing of the kernel-level data rendered Falco™ to be resource intensive service that significantly increased the number of context-switches between the kernel space and user space and vice-versa and the computing time necessary for detecting malicious activities and agents at the kernel level.

FIG. 1 is a flowchart illustrating a well-known prior art procedure where the kernel-level data is derived from the kernel space of the virtual memory of a computer-based system and transmitted to user space of the virtual memory of the computer-based system for processing based on a predetermined set of rules and relevant decision making. In step 100 of FIG. 1, a process executed within the kernel space (of a computer-based system) attempts to read a predetermined file stored in the file system of the computer-based system. Accordingly, at step 102, an 'open' system call is generated at the kernel level. Subsequently, at step 104, the invocation of the 'open' system call is detected and is considered as a kernel-level event. Subsequently, at step 106, the kernel event-related information, including at least the process ID, process-related parameters, and process context, corresponding to the 'open' system call is identified. And, at step 108, the kernel event-related information is transmitted to the user space. At step 110, the kernel even-related information is evaluated against the predetermined set of rules and a relevant decision is taken about either authorizing the underlying kernel-level event or flagging the kernel-level event as malicious. And subsequently, at step 112, the decision taken at the user space about either authorizing or denying the kernel-event is relayed back to the kernel and the kernel is triggered to execute as per the said decision.

However, as described earlier, the process of transmitting the event-related information to the user space for evaluation entails a context switch from the user space to the kernel space, and likewise, the relay of the kernel process authorization-related decision from the user space to the kernel space and the subsequent execution of the decision by the kernel space also entails a context switch from the user space to the kernel space. The process of context-switching is resource intensive and causes substantial processing and memory overheads, and thus affects the processing efficiency of the computer-based system, given the processor (embodied within the compute-based system), during every context-switch, has to save the context of the currently executed process, halt the process that is currently under execution, fetch the context of the process that is about to be executed, and switch over to the process whose context has been fetched. During the process of initiating a context-switch, the processor abstains from executing any other applications. Further, during every context-switch, the processer flushes the translation lookaside buffer (LFB) and the system cache, which again impacts the processing efficiency of the processor. And therefore, there was felt a need for a computer-implemented system, method, and computer program product that evaluated the kernel even-related information within the kernel space and minimized the context-switching between the user space and the kernel space, thereby eliminating the processing and memory overheads associated with context-switching.

The present disclosure envisages a computer-implemented system, computer-implemented method, and a computer program product that facilitate in-kernel instrumentation of kernel system calls and corresponding kernel-level functions. Referring to FIG. 2, there is shown a computer-implemented system 200 that facilitates in-kernel instrumentation of processes executed within the kernel space, including kernel system calls and any kernel-level functions that are executed within the kernel space in furtherance to the invocation of the kernel system calls. In accordance with the present disclosure, the computer-implemented system 200 includes a processor 202 communicably coupled to a virtual memory module 204 of the computer-implemented system 200. The processor 202 executes an operating system (not shown in figures) that, in turn, includes a kernel (not shown in figures). The kernel is considered the core component of the operating system and acts as an interface between the operating system and the hardware elements embodied within the computer-implemented system 200, including memory, input/output devices, and the processor 202, inter-alia. The operating system and, in turn, the kernel execute within a kernel space of the virtual memory module 204, while the non-kernel applications (also referred to as 'user applications') are executed within a user space virtual memory module 204. Typically, the processor 202 segregates the virtual memory module 204 into kernel space 204A and user space 204B, with the kernel space 204A reserved for executing the kernel and kernel extensions, and the user space reserved for executing user applications.

Typically, user applications executing within the user space 204B of the virtual memory 204 rely on kernel system calls to trigger certain requests that are to be facilitated only by the kernel and ostensibly within the kernel space 204A, and within the kernel protection domain that entails highest access privileges. Typically, user applications executing within the user space 204B of the virtual memory 204 do not entail access privileges necessary for accessing certain hardware resources embodied within the computer-implemented system 200 and therefore rely on the kernel to access such hardware resources on their behalf and perform, for example, any input/output operations on such hardware resources. And therefore, in a typical operating system involving a kernel, it is the kernel that performs computational tasks directed to highly privileged computational resources (for example, memory access, input/output operations) on behalf of the user applications; typically, the user applications request the kernel to perform such computational tasks directed to highly privileged computational resources by way of issuing kernel system calls. One of the objectives of the computer-implemented system 200 is to facilitate an in-kernel instrumentation of such kernel system calls and any kernel functions triggered by such kernel system calls, and thereby selectively categorize the processes that triggered the kernel system calls as legitimate or malicious.

In accordance with the present disclosure, the processor 202 is configured to access both the kernel space 204A and the user space 204B, and communicate with both kernel-level processes (i.e., processes executed at the kernel-level) and the user applications executing within the user space 204B. In accordance with the present disclosure, the processor 202 is configured to implement an extended Berkley Packet filter (eBPF) kernel module 206 within the kernel space 204A of the computer-implemented system 200. The eBPF kernel module 206 entails an extended Berkley Packet Filter (eBPF)-based instruction set architecture pre-configured to facilitate, inter-alia, extraction of fine-grained security related data from the kernel space 204A, tracing of applications executing within the kernel space 204A, and run-time security enforcement within the kernel space 204A.

In accordance with the present disclosure, the processor 202, in combination with the eBPF kernel module 206, performs in-kernel instrumentation of the kernel system calls and kernel-level functions spanning from or triggered by such kernel system calls. In accordance with the present disclosure, the processor 202, in combination with the eBPF kernel module 206, instruments the kernel system calls entirely within the kernel space 204A and independent of the user space 204B. Secondly, the processor 202 configures the eBPF kernel module 206 in such a manner that no kernel-level information is shared with the user space 204B, at least within the context of the instrumentation of the kernel system calls. Thirdly, the processor 202 configures the eBPF kernel module 206 in such a manner that context-switching between the user space 204B and the kernel space 204A during the in-kernel instrumentation of kernel system calls is eliminated, or at the least minimized vis-a-vis instrumenting such kernel system calls in the user space. By eliminating or at the least minimizing the context-switching between the user space 204B and the kernel space 204A during the in-kernel instrumentation of kernel-level processes, the combination of the processor 202 and the eBPF kernel module 206 reduces the data processing-related overheads that would have otherwise been incurred due to the repetitive context-switching between the user space 204B and the kernel space 204A, which would have been necessary to ensure that the kernel-level information derived from the kernel space 204A is instrumented at the user space 204B and the result of the instrumentation is relayed back to the kernel space 204A for implementation. In accordance with the present disclosure, the processor 202 configures the eBPF kernel module 206 to generate a plurality of eBPF maps (collectively represented by reference numeral 210) and to populate each of the plurality of eBPF maps 210 with information necessary for performing in-kernel instrumentation of kernel system calls. The processor 202 preferably configures and loads the eBPF kernel module 206 into the kernel space 204A of the virtual memory module 204.

As discussed earlier, a system call is spanned within the kernel space 204A when a particular process executing in the user space 204B enters the kernel space 204A and requests the kernel to perform a predetermined operation (for example, memory read/write operation or input/output operation) on its behalf. In accordance with the present disclosure, the invocation of a system call within the kernel space 204A (i.e., kernel system call) by a process is construed as a kernel-level event. One of the objectives of the computer-implemented system 200, as discussed earlier, is to perform an in-kernel instrumentation of the kernel system call, including any kernel-level functions that may be triggered or spanned by the kernel system call, entirely within the kernel space 204A, without necessitating any context-switches to the user space 204B and without necessitating sharing of any kernel-level information with the user space 204B, at least within the context of the instrumentation of the kernel system call, and thereby determine, within the kernel space 204A, if the user space process that triggered the kernel system call is legitimate or malicious.

In accordance with the present disclosure, subsequent to the invocation of a kernel system call by a process executing within the user space, the processor 202 consults a 'eBPF process filter map' created by the eBPF kernel module 206. The 'eBPF process filter map,' in accordance with the present disclosure, maps a plurality of process paths from which processes can be invoked, with the possible events that may be spanned by such processes invoked from the said process paths. In accordance with the present disclosure, the eBPF kernel module 206 creates the 'eBPF process filter map' and populates the 'eBPF process filter map' with a one-to-one mapping between a plurality of process paths from which processes can be invoked and a plurality of kernel-level events that could be triggered by the processes invoked from the said plurality of process paths. Table 1 provided hereinbelow illustrates an exemplary 'eBPF process filter map,' in accordance with the present disclosure.

TABLE 1

| eBPF process filter map | |
|---|---|
| Process | Filter |
| *, —*/bash, —*/sh, usr/bin/* | kernel event 1-'readdir' kernel system call |
| */nginx | kernel event 3-'write' kernel system call |
| */bash | kernel event 2-'fopen' kernel system call |

For instance, as illustrated in the 'eBPF process filter map,' an exemplary process termed 'xyz,' when invoked from the path 'usr/bin/*' may trigger a first kernel-level event (i.e., kernel event 1), whereas an exemplary process termed 'abc,' when invoked from the path */nginx may trigger a third kernel-level event, in accordance with the present disclosure, preferably, the kernel-level events specified in the 'eBPF process filter map' as being triggered by the corresponding processes include kernel system calls. For instance, as illustrated in the 'process filter map,' the process 'xyz' invoked from the path 'usr/bin %*' triggers a 'read' kernel system call (considered as a kernel-level event) and the process 'abc' invoked from the path */nginx triggers a 'write' kernel system call (also considered as a kernel-level event). In accordance with the present disclosure, the 'eBPF process filter map' describes the kernel system calls (kernel-level events) that could be triggered by processes invoked from specific process paths. For instance, as per the aforementioned 'process filter map,' any process invoked from the paths '-*/bash,' '-*/sh,' and 'usr/bin/*' are enabled to trigger at least the 'read' kernel system call, while any process invoked from the path '*/nginx' are enabled to trigger at least the 'write' kernel system call.

In accordance with the present disclosure, whenever a process executing in the user space 204B enters the kernel space 204A, the processor 202 determines the path from which the said process was invoked. Subsequently, when the process that entered the kernel space 204A triggers a kernel system call, the processor 202 consults the 'eBPF process filter map' and determines if the 'process path-kernel system call' pair corresponding to the process that entered the kernel space 204A is incorporated in the 'eBPF process filter map'. For example, if the process that entered the kernel space 204A was invoked from the process path '*/nginx' and if the process triggered the 'write' kernel system call, then the processor 202, based on a consultation with the 'eBPF process filter map' determines the said process to be positively matching an entry in the 'eBPF process filter map.'

In accordance with the present disclosure, if the 'process path-kernel system call' pair corresponding to a process that entered the kernel space 204A matches with any corresponding entry in the 'eBPF process filter map,' then the processor 202 decides to initiate an in-kernel instrumentation of such a process. In fact, the processor 202 is pre-programmed to initiate an in-kernel instrumentation of any process that enters the kernel space 204 and embodies a 'process path-kernel system call' pair matching an entry in the 'eBPF process filter map.' However, it is also within the scope of the present disclosure that the processor 202 is pre-programmed to initiate an in-kernel instrumentation of any process that enters the kernel space 204 regardless of whether such a process embodies a 'process path-kernel system call' pair matching an entry in the 'eBPF process filter map.'

In accordance with the present disclosure, if a process enters the kernel space 204A but does not embody a 'process path-kernel system call' pair matching an entry in the 'eBPF process filter map,' then the processor 202 triggers the eBPF kernel module 206 to create a new entry for such a process within the 'eBPF process filter map'. And subsequently, the processor 202 executes the steps mentioned hereinbelow based on the new entry made to the 'eBPF process filter map'. However, the scenario of a process entering the kernel space 204A and embodying a 'process path-kernel system call' pair matching an entry in the 'eBPF process filter map' is considered herein, only for the sake of explanation. And therefore, the following explanation should not be construed in a limiting sense, but with a broader view that encompasses both the possibilities, i.e., the process embodying a 'process path-kernel system call' pair matching an entry in the 'eBPF process filter map,' and the process embodying a 'process path-kernel system call' pair not matching any entry in the 'eBPF process filter map.' and therefore necessitating a new entry into the 'eBPF process filter map.'

In accordance with the present disclosure, when a process that entered the kernel space 204A is determined, by the processor 202, as embodying a 'process path-kernel system call' pair matching an entry in the 'eBPF process filter map,' then the processor 202 elicits at least a unique process ID (PID), a unique process namespace ID (PID_ns), and an event pointer corresponding to such a process. Subsequently, the processor 202 triggers the eBPF kernel module 206 to create an 'eBPF task map' within the kernel space 204A, and populate the 'eBPF task map' with a new entry that includes at least the unique process ID (PID), the unique process ID_namespace (PID_ns), and the event pointer corresponding to the process that entered the kernel space 204A and embodied a 'process path-kernel system call' pair matching an entry in the 'eBPF process filter map.' Table 2 provided herein below illustrates an exemplary 'eBPF task map' generated by the eBPF kernel module 206, and the fields incorporated into the 'eBPF task map'.

TABLE 2

| eBPF task map | |
|---|---|
| PID, PID_ns | Event Pointer |
| 1213, xyz | Ptr = 0x100ball, 0xcmalbclf |
| 4312, abc | Ptr = 0xcafebeke |

According to the exemplary 'eBPF task map' illustrated hereinabove, two processes referenced by PIDs '1213' and '4312' are shown as having entered the kernel space 204A and as embodying respective 'process path-kernel system call' pairs that matched any of the entries incorporated within the 'eBPF process filter map.' In accordance with the present disclosure, the processor 202 triggers the eBPF kernel module 206 to configure the 'eBPF task map' such that the information (i.e., PID, PID_ns, and event pointer) stored in the 'eBPF task map' is transmissible only within the kernel space 204A. In this manner, the processor 202 triggers the eBPF kernel module 206 to isolate the 'eBPF task map' from the user space 204B and therefore eliminates or at the least minimizes the context-switching between the user space 204B and kernel space 204A, at least during the in-kernel instrumentation of the said process.

In accordance with the present disclosure, while the processor 202 enables the eBPF kernel module 206 to render the 'eBPF task map' accessible from the user space 204B, it restricts the transmission of the information stored in the 'eBPF task map' to the kernel space 204A, thus minimizing the need for context switching between the user space 204B and kernel space 204A during the execution of the 'eBPF task map,' and consequentially during the in-kernel instrumentation of the processes referenced within the 'eBPF task map'. Preferably, the eBPF-based instructions necessary for the execution of the eBPF kernel module 206, and for triggering the eBPF kernel module 206 to create the 'eBPF task map' are loaded into the kernel space 204A by the processor 202 through a BPF system call.

In accordance with the present disclosure, subsequent to triggering the eBPF kernel module 206 to create the 'eBPF task map' and populate the 'eBPF task map' with the process ID (PID), the process ID_namespace (PID_ns), and the event pointer corresponding to the process that entered the kernel space 204A and embodied a 'process path-kernel system call' pair matching an entry in the 'eBPF process filter map,' the processor 202 triggers the eBPF kernel module 206 to create an 'eBPF event map.' The 'eBPF event map' created by the eBPF kernel module 206 includes, for every process listed within the 'eBPF task map,' the kernel system calls likely to be invoked by the said process. Preferably, the eBPF kernel module 206 programmatically consults the 'eBPF process filter map' and the 'eBPF task map' to identify the processes that entered the kernel space 204A and the kernel system calls likely to be triggered by each of the said processes that entered the kernel space 204A. Preferably, the 'eBPF event map' describes, for every process (identified either by the unique PID or unique PID_ns or both, in the 'eBPF task map), the kernel system calls invoked by the said process and the parameters for each of the kernel system calls invoked by the said process. Within the 'eBPF event map,' the processor 202 maps the system calls invoked by the said process and the parameters embodied within the kernel system calls, as illustrated in the below-mentioned table. For the sake of explanation, the parameters embodied with the kernel system calls trigged by the said process are referred to as 'process-related parameters.' Table 3 provided hereinbelow illustrates an exemplary 'eBPF event map' generated by the eBPF kernel module 206, and the fields incorporated into the 'eBPF event map.'

TABLE 3 eBPF event map

| Kernel System Call or Kernel-Level Event | Parameters | First Jiffy and Maximum Jiffy | Count and Max_Count |
|---|---|---|---|
| fopen | ("/etc/passwd", "w") | 4325421/10212 | 1/5 |
| readdir | (*, —/home/*) | | |

The exemplary 'eBPF event map' illustrated above describes the kernel system calls triggered by the process having a process ID (PID) '123' and a process namespace ID (PID_ns) 'xyz'. As per the illustration provided in the above 'eBPF event map,' the process triggers two kernel system calls, i.e., 'fopen' and 'readdir,' on entering the kernel space 204A. The parameters corresponding to both the kernel system calls are also illustrated in the aforementioned 'eBPF event map.' In accordance with the present disclosure, the 'eBPF event map' also describes the variables 'count' and 'maximum count (max count'). In accordance with the present disclosure, the current value held by the variable 'count' is used as an indicator by the processor 202 to determine whether a corresponding kernel system call has been previously instrumented within the kernel space 204A. Preferably, the processor 202 sets the value of the variable 'count' to 'zero' when the corresponding entry is made into the 'eBPF event map' by the eBPF kernel module 206, thereby indicating that the corresponding kernel system call is yet to be instrumented within the kernel space 204A.

In accordance with the present disclosure, after the in-kernel instrumentation of the corresponding kernel system call, the processor 202 increments the value stored within the variable 'count' by 'one', thereby indicating that the corresponding kernel system call has been instrumented within the kernel space 204A. Typically, the value of the variable 'count' would be a non-zero value (i.e., a value greater than zero) for a kernel system call that has already been instrumented by the processor 202. However, if the value of the variable 'count' is set to 'zero', it implies that the corresponding kernel system call is yet to be instrumented by the processor 202.

Further, the variable 'maximum count' or 'max count' described in the 'eBPF event map' is derived based on a 'rate-limiting factor,' which, in turn, describes the maximum number of times a kernel system call could be invoked by a corresponding process within a time period of 'one' second. For example, if the 'readdir' kernel system call is designated to be triggered 'twenty' times within a second by a corresponding process, then the 'rate-limiting factor' for the corresponding process-kernel system call pair would be 'twenty' per second and the value assigned to the variable 'maximum count' or 'max count' would be 'twenty.' Preferably, the variable 'maximum count' or 'max count' always holds a non-zero value, for it defines the maximum number of times the corresponding kernel system call could be legitimately triggered by the corresponding process, without generating any instrumentation-based alert messages.

Further, the 'eBPF event map' also describes the variables 'first jiffy', 'maximum jiffy,' 'current jiffy,' and 'total jiffy,' that are variables of the type 'unsigned long volatile' and are derived from the variable type 'jiffy' that, in turn, describes the kernel unit of time. For the sake of brevity, the variables 'current jiffy' and 'total jiffy' have not been illustrated in the 'eBPF event map'. Nevertheless, these two variables ('current jiffy,' and 'total jiffy') influence the manner in which values are assigned to the variables 'first jiffy' and 'maximum jiffy.' In accordance with the present disclosure, 'current jiffy' is a monotonically varying kernel-specific jiffy value used by kernel sub-systems to calculate system timing-related requirements. Typically, the value assigned to the variable 'current jiffy' would be the number of timer interrupts that would have occurred since the kernel was last booted. Typically, when a kernel system call is instrumented for the first time by the processor 202, the value of the variable 'count' would have been 'zero'; as discussed above, the value of the variable 'count' will be incremented by 'one' after the completion of the first-time instrumentation of the said kernel system call by the processor 202. Likewise, when the value assigned to the variable 'count' is 'zero,' the value stored within the variable 'first jiffy' would also be 'zero.'

Further, the variables 'first jiffy' and 'maximum jiffy,' in combination, are also used to identify whether a corresponding kernel system call has already been instrumented by the processor 202. In accordance with the present disclosure, prior to the first-time instrumentation of the said kernel system call by the processor 202, the variable 'count' and 'first jiffy' are initialized to 'zero,' and the value of the variable 'current jiffy' is set to a pre-determined kernel-specific value indicative of the number of timer interrupts that have occurred since the kernel was last booted. Further, when the said kernel system call is instrumented for the first time by the processor 202, then, as shown in 'eBPF event map' against the kernel system call 'fopen,' the 'first jiffy' is assigned a non-zero value (i.e., in this example, 4325421), which is equivalent to the value stored in the variable 'current jiffy'. Therefore, in an event the value stored in the variable 'first jiffy' is equivalent to the value stored in the variable 'current jiffy', then the processor 202 determines that the said kernel system call has already been instrumented at least once; the current value of the variable 'count' illustrates the exact number of times the corresponding kernel system call has been instrumented. For example, if the current value of the variable 'count' is 'three', then it is to be understood that the corresponding kernel system call has been instrumented 'thrice' in the past.

In accordance with the present disclosure, if the value assigned to the variable 'first jiffy' is 'zero,' then the processor 202 determines that the corresponding kernel system call is yet to be instrumented. However, if the processor 202 determines that the value assigned to the variable 'first jiffy' is a value greater than 'zero' and equivalent to the value assigned to the variable 'current jiffy'—which is only possible if the corresponding kernel system call has already been instrumented—then the processor 202 determines that the corresponding kernel system call has already been instrumented and retransmits the diagnostic alert message—categorizing the process that invoked the said kernel system call as either authentic or malicious—that was generated when the said kernel system call was previously instrumented.

Further, in accordance with the present disclosure, after determining, based on the values assigned to the variables 'count' and 'first jiffy' respectively, that the corresponding kernel system call has been previously instrumented, the processor 202 determines a value assignable to a variable 'total jiffy' as a function of the absolute value of the difference between the values assigned to the variables 'first jiffy' and 'current jiffy' respectively. Subsequently, the processor 202 compares the value assigned to the variable 'total jiffy' (i.e., the absolute value of the difference between the values of the variables 'first jiffy' and 'current jiffy') with the 'rate-limiting factor' and determines whether the value assigned to the variable 'total jiffy' is greater than the 'rate-limiting factor.' And, in an event the value assigned to the variable 'total jiffy' is greater than the 'rate-limiting factor,' then the processor 202 determines whether the value assigned to the variable 'count' is greater than the value assigned to the variable 'max count'. And, in an event the value assigned to the variable 'count' is greater than the value assigned to the variable 'max count,' then the processor 202 determines that the corresponding kernel system call has already been instrumented and retransmits the diagnostic alert message categorizing the process that invoked the said kernel system call as either authentic or malicious—that was generated when the said kernel system call was previously instrumented.

Subsequently, the processor 202 resets the value of the variable 'count' to 'zero' so that the corresponding kernel system call could be instrumented once again on a subsequent invocation. Essentially, following the first-time instrumentation of the said kernel system call, the said kernel system call would never be re-instrumented by the processor 202 until the value assigned to the variable 'count' is determined, by the processor 202, as exceeding the value assigned to the variable 'max count,' and until the value assigned to the variable 'total jiffy' is determined, by the processor 202, to be greater than the 'rate-limiting factor,' And until the said kernel system call is re-instrumented, the processor 202 keeps retransmitting the same diagnostic alert message that was generated when the said kernel system call was previously instrumented. In this manner, the processor 202, in combination with the eBPF kernel module 206, facilitates selective in-kernel instrumentation of kernel system calls and ensures that a kernel system call that has been previously instrumented will no longer be re-instrumented as long as it is trigged by the same process embodying the same process parameters as the previous instance on every corresponding invocation unless previously instrumented. In this manner, the processor 202 eliminates the memory operations-related overheads and processing operations-related overheads that would otherwise have been incurred for repetitive instrumentation of the already instrumented kernel system call.

In accordance with the present disclosure, the processes incorporated within in the 'eBPF task map' are interlinked, by the eBPF kernel module 206, with the 'kernel system calls' described in the 'eBPF event map' such that for every process described in the 'eBPF task map', there exists a corresponding 'kernel system call' in the 'eBPF event map'. In accordance with an exemplary embodiment of the present disclosure, both the 'eBPF task map' and 'eBPF event map' are configured by the eBPF kernel module 206 to maintain a list of 'PIDs' and 'PID_ns' identifying the corresponding processes even though the present disclosure illustrates, only for the sake of explanation, the 'PIDs' and 'PID_ns' to be a part of only the 'eBPF task map'.

In accordance with the exemplary embodiment of the present disclosure, the 'PID' or the 'PID_ns' could be used as a primary key within the 'eBPF task map' and as a foreign key within the 'eBPF event map' such that every process identified by a corresponding 'PID' and/or 'PID_ns' in the 'eBPF task map' is associated with a corresponding 'kernel system call' listed within the 'eBPF event map'. Typically, the process ID (PID) and the process namespace ID (PID_ns) is unique to every process, and therefore the processor 202 utilizes either the process ID (PID) or the process namespace ID (PID_ns) as a primary key and arranges the entries within the 'eBPF task map,' such that within the 'eBPF task map' every process is uniquely identified based on either the process ID (PID) or the process namespace ID (PID_ns).

Likewise, the processor 202 utilizes either the unique process ID (PID) or the unique process namespace ID (PID_ns) as a foreign key within the 'eBPF event map' and programmatically interlinks every process described within the 'eBPF task map' with the corresponding kernel system calls and kernel system call parameters (also referred to as process-related parameters) described in the 'eBPF event map,' based on the unique process ID (PID) or the unique process namespace ID (PID_ns). In accordance with the exemplary embodiment of the present disclosure, the processes identified in the 'eBPF task map' and the 'kernel system calls' described in the 'eBPF event map' are interlinked and arranged based on the corresponding 'PID' or 'PID_ns,' with either 'PID,' or 'PID_ns,' or both incorporated within both the 'eBPF task map' and the 'eBPF event map,' even though the present disclosure illustrates, only for the sake of explanation, the 'PIDs' and 'PID_ns' to be a part of only the 'eBPF task map'.

Preferably, either 'PID' or PID_ns' function as the 'primary key' for the 'eBPF task map' and as the 'foreign key' for the 'eBPF event map'. The information stored in the 'eBPF task map' is interlinked with the information stored in the 'eBPF event map, based on the PID' or 'PID_ns.' Particularly, the processes indicated by the process IDs or process namespace IDs (or both) stored in the 'eBPF task map' are interlinked with the kernel system call names and the kernel system call parameters stored in the 'eBPF event map' such that given a process ID, the kernel system calls likely to be invoked by the process identified by the said process ID (or process namespace IDs, or both) and the kernel system call parameters corresponding to the said kernel system calls can be determined.

As discussed hitherto, the 'eBPF event map' describes, for every process (identified either by the unique PID or unique PID_ns or both, in the 'eBPF task map), the kernel system calls invoked by the process, the kernel system call parameters for each of the kernel system calls invoked by the process. In similarity to the 'eBPF task map,' the 'eBPF event map' is also configured, by the eBPF kernel module 206, such that the information stored within the 'eBPF event map' is transferable only within the kernel space 204A. In this manner, the eBPF kernel module 206 isolates the 'eBPF event map' from the user space 204B and eliminates or at the least minimizes the context-switching between the user space 204B and kernel space 204A during the instrumentation of the corresponding kernel system call. In accordance with the present disclosure, while the eBPF kernel module 206 renders the 'eBPF event map' accessible from the user space 204B, it restricts the transmission of the information stored in the 'eBPF event map' to the kernel space 204A, thus minimizing the need for context switching between the user space 204B and kernel space 204A during the execution of the said 'eBPF event map,' and consequentially during the instrumentation of the corresponding kernel system call. Preferably, the eBPF-based instructions necessary for triggering the eBPF kernel module 206 to create the 'eBPF event map' are loaded into the kernel space 204A by the processor 202 through a BPF system call.

In accordance with the present disclosure, the processor 202 cooperates with the eBPF kernel module 206 to access the 'eBPF task map,' the 'eBPF event map,' and the 'eBPF process filter map.' Essentially, when a process executing within the user space 204B enters the kernel space 204A, the processor 202 consults the 'eBPF process filter map' and identifies the path corresponding to the said process. Subsequently, from the 'eBPF process filter map,' the processor 202 determines the possible kernel-level events, i.e., kernel system calls, likely to be invoked by the said process. Subsequently, the processor 202 triggers the eBPF kernel module 206 to create an 'eBPF task map' within the kernel space 204A and to populate the 'eBPF task map' with at least the process ID (PID) and process namespace ID (PID_ns) corresponding to the said process, i.e., the process that entered the kernels space 204A. Subsequently, the processor 202 triggers the eBPF kernel module 206 to create an 'eBPF event map' within the kernel space 204A and to populate the 'eBPF event map' with at least the kernel system calls likely to be invoked by the said process (i.e., the process that entered the kernels space 204A, and was identified by the corresponding process ID (PID) and process namespace ID (PID_ns) within the 'eBPF task map') and the kernel system call parameters (also referred to as process-related parameters) corresponding to the said kernel system calls. Preferably, the information directed to the kernel system calls likely to be invoked by the said process could be derived from the 'eBPF process filter map' that incorporates the path corresponding to every process that enters the kernel space 204A and the kernel-level events (i.e., kernel system calls) that could be triggered by the said processes invoked from the said paths.

The processor 202 interlinks the said process that entered the kernel space 204A (identified by the process ID and process namespace ID in the 'eBPF task map) with the kernel system calls likely to be triggered by the said process and the corresponding kernel system call parameters, based on either the process ID or the process namespace ID stored as a primary key in the 'eBPF task map' and as a foreign key in the 'eBPF event map.' In accordance with the present disclosure, when the process that entered the kernel space 204A triggers a kernel system call specified in the 'eBPF event map,' the processor 202 programmatically consults an 'eBPF probes map' pre-generated by the eBPF kernel module 206 within the kernel space 204A. Preferably, the 'eBPF probes map' incorporates a list of kernel-level events, i.e., a list of kernel system calls, likely to be triggered by the processes entering the kernel space 204A, a list of kernel-executable instrumentation subroutines that are to be executed within the kernel space 204A as a response to the triggering of the corresponding listed kernel-level events, and the bytecode pointers pointing to the corresponding kernel-executable instrumentation subroutines stored within the user space 204B.

In accordance with the present disclosure, the processor 202 programmatically consults the 'eBPF task map' and uniquely identifies every process that enters the kernel space 204A. Likewise, the processor 202 programmatically consults the 'eBPF event map' and identifies the kernel system calls and kernel system call parameters corresponding to every process that enters the kernel space 204A. Likewise, the processor 202 programmatically consults the 'eBPF probes map' and identifies the kernel-executable instrumentation subroutines that are to be executed within the kernel space 204A in response to the triggering of the kernel system calls by every process that enters the kernel space 204A. Table 4 provided hereinbelow illustrates an exemplary 'eBPF probes map,' in accordance with the present disclosure.

TABLE 4 eBPF probes map

| Kernel System Call or Kernel-Level Event | Hook Point | Bytecode File |
|---|---|---|
| unlink | kprobe_unlink | unlink.bo |
| readdir | Kprobe_readdir | readdir.bo |

In accordance with an exemplary embodiment of the present disclosure, the kernel system call names (or kernel-level event names) stored within the 'eBPF event map' function as a primary key. Likewise, the kernel system call names (or kernel-level event names) stored within the 'eBPF probes map' function as a foreign key' such that every kernel system call identified by a corresponding kernel system call name within the 'eBPF event map' is associated with a corresponding bytecode pointer stored in the 'eBPF probes map' and linked to a corresponding kernel-executable instrumentation subroutine. In this manner, every kernel system call or kernel-level event specified in the 'eBPF event map' is programmatically linked to the corresponding bytecode pointers stored within the 'eBPF probes map,' such that the kernel-executable instrumentation subroutines pointed to by the respective bytecode pointers are executed within the kernel space 204A when the corresponding kernel system calls are triggered by the processes identified in the 'eBPF task map' and the 'eBPF event map.'

In accordance with the present disclosure, whenever a process that enters the kernel space 204A triggers a kernel system call, the processor 202 programmatically consults the 'eBPF probes map' and identifies the kernel-executable instrumentation subroutine that has to be executed within the kernel space 204A to instrument the triggered kernel system call. As Illustrated in the exemplary 'eBPF probes map,' whenever the said process (i.e., the process that entered the kernel space 204A and is listed in the 'eBPF task map') triggers a kernel system call (i.e., the kernel system call specified in the 'eBPF event map') from the kernel space 204A, the process 202 recognizes the triggering of the said kernel system call by the said process. The processor 202 programmatically consults the 'eBPF probes map' and loads into the kernel space 204A, the kernel-executable instrumentation subroutine linked, within the 'eBPF probes map,' to the said kernel system call invoked by the said process. The processor 202 subsequently triggers the execution of the loaded kernel-executable instrumentation subroutine within the kernel space 204A, and thereby instruments the said kernel system call triggered by the said process, within the kernel space 204A. In accordance with the present disclosure, the phenomena of instrumenting the kernel system call within the kernel space 204A is referred to as the in-kernel instrumentation of the kernel system call. The processor 202 subsequently generates the diagnostic message, categorizing the said process that invoked the said kernel system call as either authentic or malicious, based on the in-kernel instrumentation of the said kernel system call, and further based on the compliance exhibited by the said process to the rate limit-based rules and temporal correlation-based rules embodied within the kernel-executable instrumentation subroutine that instrumented the said process. Preferably, the diagnostic alert message is pushed from the kernel space 204A onto an input/output device, for example, a display monitor (not shown in figures) of the computer-implemented system 200 for display thereon, and for the perusal of a system administrator.

As discussed hitherto, whenever a process enters the kernel space 204A, the processor 202, in combination with the eBPF kernel module 206, elicits the information identifying such a process, i.e., at least the process ID and process namespace ID, and enters the said information into the 'eBPF task map' in the form of a new entry. Subsequently, the processor 202, in combination with the eBPF kernel module 206, elicits the information corresponding to the kernel system calls likely to b triggered by the process that entered the kernel space 204A, and enters the kernel system calls-related information, i.e., the kernel system call names and the corresponding kernel system call parameters, into the 'eBPF event map' in the form of a new entry. Subsequently, the processor 202, in combination with the eBPF kernel module 206, programmatically consults the 'eBPF probes map' and determines if there are any probes (kernel-executable instrumentation subroutines) listed within the 'eBPF probes map' against the said kernel system calls described by the 'eBPF event map.' In an event the 'eBPF probes map' lists a kernel-executable instrumentation subroutine as corresponding to the kernel system call executed by the said process, then the processor 202 matches, within the kernel space 204A, the parameters of the kernel system call executed by the said process and the rules prescribed within the kernel-executable instrumentation subroutine listed within the 'eBPF probes map' as corresponding to the kernel system call triggered by the said process. Subsequently, if the parameters of the kernel system call executed by the said process match with the rules specified within the said kernel-executable instrumentation subroutine, then the processor 202 executes the said kernel-executable instrumentation subroutine within the kernel space 204A and thereby instruments the kernel system call triggered by the said process, within the kernel space 204A.

The kernel-executable instrumentation subroutines are preferably stored in the user space 204B. When the processor 202 consults the 'eBPF probes map' and identifies a kernel-executable instrumentation subroutine listed within the 'eBPF probes map' as corresponding to the kernel system call triggered by the said process (i.e., the process that entered the kernel space 204A), the kernel-executable instrumentation subroutine thus identified is loaded from the user space 204B onto the kernel space 204A. Subsequently, the process 202 matches the parameters of the said kernel system call (also referred to as process-related parameters) with the pre-defined instrumentation-related rules embodied within the said kernel-executable instrumentation subroutine. In case the parameters of the said kernel system call match with the pre-defined instrumentation-related rules embodied within the said kernel-executable instrumentation subroutine, then the processor 202 triggers the execution of the said kernel-executable instrumentation subroutine within the kernel space 204A and thus facilitates in-kernel instrumentation of the said kernel system call triggered by the said process and the subsequent in-kernel categorization (i.e., categorization made within the kernel space 204A) of the said process as either authentic or malicious.

In the case of prior art instrumentation systems, on finding a kernel-executable instrumentation subroutine corresponding to the kernel system call triggered by the said process, the processor 202 would have initiated a context-switch from the user space 204B to the user space 204B and would have attempted to match the parameters of the said kernel system call with the pre-defined instrumentation-related rules embodied within the said kernel-executable instrumentation subroutine at the user space 204B. And after finding a match, the processor 202 would have executed the kernel-executable instrumentation subroutine at the user space 204B and instrumented the said kernel system call within the user space 204B. Subsequently, the processor 202 would have initiated yet another context-switch from the user space 204B to the kernel space 204A such that the results of the instrumentation of the kernel system call could be communicated to the kernel space 204A.

However, the processor 202 envisaged by the present disclosure cooperates with the 'eBPF event map' to match the parameters of the said kernel system call with the pre-defined instrumentation-related rules embodied within the said kernel-executable instrumentation subroutine; the processor 202 cooperates with the 'eBPF probes map' to identify the said kernel-executable instrumentation subroutine. Since both the parameters of the said kernel system call and the information identifying the said kernel-executable instrumentation subroutine are available respectively within the 'eBPF event map' and the 'eBPF probes map' stored within the kernel space 204A, the processor 202, in this case, performs the matching entirely within the kernel space 204A and does not initiate a context switch to the user space 204B to perform the said matching. In accordance with the present disclosure, the eBPF kernel module 206 stores the 'eBPF process filter map,' 'eBPF task map,' eBPF event map,' and 'eBPF probes map' within the kernel space 204A instead of the user space 204B and thereby enables the processor 202 to access the process-related information (stored in the 'eBPF task map'), kernel system call-related information (stored in the 'eBPF event map'), and kernel-executable instrumentation subroutines-related information (stored in the 'eBPF probes map') seamlessly from the kernel space 204A, and facilitate the instrumentation of the said kernel system call and, in turn, the said process entirely within the kernel space 204A.

Further, the processor 202, in accordance with the present disclosure, executes the kernel-executable instrumentation subroutine within the kernel space 204A instead of the user space 204B, for both the parameters of the said kernel system call as well as the information identifying the said kernel-executable instrumentation subroutine are available within the kernel space 204A, and instruments the kernel system call triggered by the said process within the kernel space 204A, instead of the user space 204B. In this manner, the processor 202 envisaged by the present disclosure does not necessitate any context-switching between the kernel space 204A and the user space 204B during the instrumentation of the kernel system call, and thus minimizes the processing-related overheads and memory operations-related overheads that otherwise would have been incurred for facilitating the context-switching between the kernel space 204A and user space 204B and vice-versa. Further, the processor 202 instruments the kernel system call independent of and thus without any intervention from the user space 204B.

In accordance with the present disclosure, the processor 202 triggers a kprobe generation module 208 to insert a kprobe into every process that enters the kernel space 204A and is identified in the form of an entry in the 'eBPF task map.' Therefore, in this case, when the said process enters the kernel space 204A and when the information corresponding to the said process, i.e., the process ID, process namespace ID, kernel system calls, and kernel system call parameters, is captured by the eBPF kernel module 206 and represented across the 'eBPF event map,' the processor 202 triggers the kprobe generation module 208 to programmatically insert a kprobe into a predetermined, specific location within the said process. Preferably, the kprobe is attached to a predetermined, desired hookpoint. In accordance with the present disclosure, the kprobe is attached to the triggering of the kernel system call by the said process such that the kprobe executes when the said process triggers the said kernel system call. Preferably, the execution of the kprobe is triggered only when the said process triggers the said kernel system call. In accordance with the present disclosure, the 'eBPF probes map' illustrates the mapping between the kernel system calls (also specified in the 'eBPF event map'), the kprobes that are to be invoked on triggering of the said kernel system calls, and bytecode pointers pointing to pre-defined kernel-executable instrumentation subroutines that are to be executed on invocation of the corresponding kprobes.

And, in accordance with the present disclosure, during the execution of the said process within the kernel space 204A, when the said process triggers the corresponding kernel system call (specified in the 'eBPF event map' as well as the 'eBPF probes map'), the execution of the corresponding kprobe is triggered. And during the execution of the kprobe, the processor 202 consults the 'eBPF probes map' and identifies the bytecode pointer and subsequently the kernel-executable instrumentation subroutine that has to be executed in response to the invocation of the said kprobe. Preferably, the said kprobe, upon execution, triggers the implementation of the corresponding kernel-executable instrumentation subroutine that, in turn, instruments the kernel system call triggered by the said process and determines, based on a consequential execution of the predetermined instrumentation-related rules embodied within the kernel-executable instrumentation subroutine, whether the said process that triggered the said kernel system call is authentic or malicious. Further, during the instrumentation of the said kernel system call, the processor 202 determines whether the said kernel system call invoked by the said process complies with the rate-limit based rules and temporal correlation-based rules embodied within the said kernel-executable instrumentation subroutine. Preferably, if the kernel system call is determined non-compliant with and thus violating either the rate-limit based rules, or temporal correlation-based rules, or both, then the processor 202 determines the said process to be malicious and generates a diagnostic alert message that, in turn, describes the violation of either the rate-limit based rules, or temporal correlation-based rules, or both by the said kernel system call and, in turn, the said process. Preferably, the processor 202 associates a severity level with the said diagnostic alert message, with the severity level determined based on the extent of violation of the rate-limit based rules, or temporal correlation-based rules, or both by the said kernel system call and, in turn, the said process.

In accordance with the present disclosure, the predetermined rules embodied within the kernel-executable instrumentation subroutines include rate limit-based rules and temporal correlation-based rules. Preferably, a rate-limit based rule is configured to be triggered when a kernel system call (for example, 'readdir') is invoked with specific parameters, more than 'ten' times per second. Further, the triggering of the rate limit-based rule could culminate in creating a diagnostic alert message pre-associated with a severity level. Typically, severity levels are associated with kernel vulnerabilities, with higher kernel vulnerabilities represented by severity levels 'four' and 'five' and medium-level kernel vulnerabilities represented by severity level 'three,' and low-level kernel vulnerabilities represented by severity levels 'one' and 'two.' Typically, larger the extent of violation of the rate-limit based rules, or temporal correlation-based rules, or both by the said process and, in turn, the corresponding kernel system call, severe will be the corresponding kernel vulnerability.

In the aforementioned scenario, when the rate limit-based rule is triggered, the diagnostic alert message issued in response may entail a severity level 'five,' thus signifying the presence of a high kernel vulnerability and a reasonably larger violation of the rules embodied within the corresponding kernel-executable instrumentation subroutine, by the kernel system call. Further, it is possible that the rate limit-based rule is configured to bypass the instrumentation of certain processes when the kernel system calls invoked by the said processes incorporate certain pre-defined directories or folders as parameters. And typically, such processes that are configured to bypass the instrumentation are referred to as exceptions to the (implementation of) rate limit-based rule.

In accordance with an exemplary embodiment of the present disclosure, the rate limit-based rule is used to draw a system administrator's attention to a time-based, rate-limit action-related vulnerability. For instance, even though deleting a particular file is prima-facie a legitimate and frequently occurring action, if delete actions directed to multiple files are witnessed within a short span of time, it could symbolize an attacker attempting to delete multiple files at one go. And in such circumstances, the rate limit-based rule, when configured, monitors each of the multiple 'unlink' kernel system calls (which provided for specific files to be deleted) and flags those 'unlink' kernel system calls which occur repetitively within a time span pre-defined by the system administrator. For instance, the rate limit-based rule could be configured to implement a user-defined, time-based rate-limit of 'ten' seconds per minute as a construct and flag each of the 'unlink' kernel system calls which occur within the user-defined 'ten' seconds time window.

In accordance with the present disclosure, the temporal correlation-based rules are configured to monitor and audit the execution of at least 'two' temporally correlated kernel system calls. For instance, the invocation of a first kernel system call (for example, 'connect' kernel system call) is 'followed by invocation of a second kernel system call (for example, 'unlink' kernel system call), the temporal correlation-based rule temporally correlates the first kernel system call and the second kernel system call, and, in turn, correlates the socket and the memory address for which the connection request was issued, with the filename for which the unlink command is issued, and determines the rate at which both the kernel system calls were executed. For instance, if the 'connect' system call was invoked 'twice' per minute, followed by invocation of the 'unlink' kernel system call at a rate of 'ten' times per second, the temporal correlation-based rule is triggered to generate an alert embodying a severity level 'one.'

In accordance with another embodiment of the present disclosure, the temporal correlation-based rules are used to temporally correlate a plurality of 'read' operations with a plurality of 'connect,' and 'network send' kernel system calls in a time-based manner and determine if the data derived through the read operations is surreptitiously transmitted for unauthorized access and use via the plurality of 'connect' and 'network send' kernel system calls. In order to determine whether the read operations are linked to the 'connect' and 'network send' kernel system calls, the temporal correlation-based rule makes use of time-based constructs and determines if the read operations are linked to the 'connect,' and 'network send' kernel system calls in a time-based manner. For example, if the 'connect' kernel system call is executed 'twice' per second and if the 'read' kernel system call (for executing read operations) is invoked 'fifty' times per second, and if the 'write' kernel system call is invoked 'ten' times per second, then the temporal correlation-based rule temporally correlates in a time-based manner the 'connect,' 'read,' and 'write' kernel system calls and generates an alarm embodying severity level 'one.' Further, it is possible that the temporal correlation-based rule is configured to instrument 'read' kernel system calls directed only to pre-designated file paths and 'write' kernel system calls directed only to non-private destination IP addresses. And in such a case, all the file paths which have not been pre-designated and all the private destination IP addresses form exceptions to the implementation of the temporal correlation-based rule.

In accordance with the present disclosure, both the rate limit-based policy and the temporal correlation-based policy could either be a host-based policy or a container-based policy. As the name suggests, the container-based policy will be applicable to one or more processes forming a group (container) and thus isolated from the remaining processes executed by the computer-implemented system 200, whereas the host-based policy, as the name suggests, will be applicable to all the processes executed within the computer-implemented system 200, regardless of the presence of containers. In accordance with the present disclosure, regardless of the policy being a container-based policy or a host-based policy, the processor 202 creates a 'process specification table' that lists all the containers under execution in the computer-implemented system 200 and the corresponding container namespace IDs. Table 5 provided hereinbelow illustrates an exemplary 'process specification table.'

TABLE 5

| process specification table | | |
|---|---|---|
| Container-PID_ns | Process Specification | Event Filter Specification |
| 12345 | * | [event1-fd1, event2-fd2] |
| 53678 | /usr/bin/*sh | [event3-fd3] |
| 12132 | *, —*/*sh | [event4-fd4, event5-fd5] |
| 0 | — | — |

In accordance with the present disclosure, the value 'zero' assigned to the container-PID_ns indicates that the underlying policy is a host-based policy. Preferably, process namespace ID (PID_ns) is a non-zero static value that does not change until the kernel of the computer-implemented system 200 is rebooted. Further, any integer value or a value denoted by a set of integers, other than 'zero,' as container-PID_ns indicates that the underlying policy is a container-based policy. Further, in the process specification table, the column termed 'process specification' defines at least the directories and the executable files on which the processes embodied in the container identified by 'Container-PID_ns' act upon, during execution.

Further, in the 'process specification table,' the column 'event filter Specification' stores the combination of file descriptors and kernel-level events that invoke the said file descriptors. As illustrated in the 'event filter Specification' column, the file descriptors (FD) will be executed by the processor 202 in response to the invocation of the corresponding kernel-level events, i.e., kernel system calls. As per the 'event filter specification' column, the file descriptors are illustrated in combination with the kernel-level events. For example, as per the column 'event filter specification,' triggering of a first kernel-level event by the container having the process namespace ID '12345' will trigger the execution of the first file descriptor (FD1) and triggering of a second kernel-level event by the container having the process namespace ID '12345' will trigger the execution of the second file descriptor (FD2). Likewise, triggering of a third kernel-level event by the container having the process namespace ID '53678' will trigger the execution of the third file descriptor (FD3), and so on.

Further, in accordance with the present disclosure, the kernel-executable instrumentation subroutines are identified by the processor 202 based on the invocation of corresponding kernel system calls. Further, in accordance with the present disclosure, a specialized map termed 'program array' is created and subsequently populated with kernel-executable instrumentation subroutines corresponding to each of the kernel system calls, and file descriptors corresponding to each of the kernel-executable instrumentation subroutines. Further, in accordance with the present disclosure, the processor 202 utilizes the file descriptors to look up for the corresponding kernel-executable instrumentation subroutines whenever the kernel system calls corresponding to the kernel-executable instrumentation subroutines are executed.

In accordance with the present disclosure, whenever a process running in a container generates a kernel system call, the container-process namespace ID corresponding to the said process, as specified in the 'process specification table,' is matched against the process namespace ID entries in the eBPF process filter map created and populated by the eBPF kernel module. In an event there exists a match, a new entry is added onto a 'process filter table,' located within the kernel space 204A and managed by the eBPF kernel module 206. In accordance with the present disclosure, the 'process filter table' stores the mapping between the 'container-PID_ns-PID-event ID' triplets and the file descriptors and kernel-level events pairs, as illustrated in the 'event filter specification' column of the 'process specification table.' Preferably, the combination of file descriptors and kernel-level events functions as a primary key for the 'process specification table' and as a foreign key for the 'process filter table,' such that the information provided in the 'process specification table' could be interlinked with the information incorporated into the 'process filter table.' Table 6 provided hereinbelow illustrates an exemplary 'process filter table.'

TABLE 6 process filter table

| PID_ns, PID, Event ID | Event Filter-File Descriptor | Data |
|---|---|---|
| 0xcafegaih, 0xlaceimpr, SYSCALL-CONNECT | FD1, FD2 | Rate Information |

In accordance with the present disclosure, if none of the process namespace ID entries in the 'eBPF process filter map' match with the container-process namespace ID entry in the process specification table indicating the container process that triggered the kernel system call, the said process is not instrumented by the processor 202. In this manner, the processor 202 prevents the creation of additional memory processing-related overheads and control-related overheads, which would have otherwise been incurred while instrumenting the said process running in the container.

As discussed hitherto, when a process running in a container invokes a kernel-level event, i.e., a kernel system call, a specialized kernel-executable instrumentation subroutine, stored in the user space 204B in the form of bytecode, is invoked for instrumenting the said kernel system call. The specialized kernel-executable instrumentation subroutine and, in fact, each of the specialized kernel-executable instrumentation subroutines envisaged by the present disclosure is pre-configured to define a corresponding event information data structure.

The event information data structure essentially describes the corresponding event ID (the event ID indicative of the triggering of the kernel system call) and the context of the triggered kernel system call; for instance, the context could include a set of CPU register values and information describing a process state. In accordance with the present disclosure, after the event information data structure has been defined by the corresponding kernel-executable instrumentation subroutine, the process 202 programmatically matches the container-process namespace ID entry in the 'process specification table,' indicative of the container process that triggered the kernel system call, with the process namespace ID entries in the 'eBPF process filter map,' and determines whether there exists a match. Subsequently, on finding a match, the processor 202 identifies the file descriptors to be implemented in response to the kernel system call triggered by the said container process. Further, the file descriptors identified by the processor 202 are loaded onto the event information data structure maintained by the corresponding kernel-executable instrumentation subroutine. Preferably, the processor 202 identifies the file descriptors for execution by executing a specialized 'event matching bytecode instruction set' on the 'process filter table.' Preferably, the 'event matching bytecode instruction set' is loaded only once into the kernel space 204A and is considered commonly applicable for all the kernel system calls invoked by the container processes, i.e., processes running in containers.

As described hitherto, in an event there exists a match between the container-process namespace ID entry in the 'process specification table' and the process namespace ID entries in the 'eBPF process filter map,' the processor 202 elicits the file descriptors corresponding to the matched process namespace ID from the 'process specification table' and specifically from the 'event filter specification' column. Preferably, file descriptors are used to uniquely represent kernel event handlers. Preferably, the processor 202 implements the kernel event handlers using the phenomenon of tail call processing, which, in turn, allows for the event handlers of the same type to be executed with minimal processing overheads and with reuse of the same underlying stack frame unlike the case of a typical function call. Subsequently, each of the kernel event handlers corresponding to the matched process namespace ID is implemented and the corresponding kernel system call triggered by the said container process is instrumented, in accordance with the present disclosure, each of the kernel event handlers identified by the corresponding file descriptors in the 'event filter specification' column of the 'process specification' table are kernel-executable instrumentation subroutines that are automatically compiled only when the corresponding file descriptors are processed by the processor 202 using the tail calling phenomenon.

Subsequently, the execution of such a kernel-executable instrumentation subroutine facilitates instrumentation of the corresponding kernel system call and, in turn, the process that triggered the said kernel system call. Further, the processor 202, after instrumenting the kernel system call generates an audit event if the instrumented kernel system call is determined to be violating a pre-defined rate-limit policy, or a temporal correlation policy, or both, embodied within the kernel-executable instrumentation subroutine.

In accordance with the present disclosure, for every new process that invokes a kernel system call and for which a corresponding process namespace ID entry is present in both the 'process specification table' and the 'eBPF process filter map,' a new entry is automatically added onto the 'process filter table,' which, as discussed earlier, stores a mapping between the 'container-PID_ns-PID-event ID' triplets and file descriptors and kernel-level events pairs. Further, the 'process filter table' is also configured to store information directed to at least the rate limit-related information and temporal correlation-related information corresponding to the container processes identified by the corresponding container-PID_ns.

In accordance with the present disclosure, kernel-executable instrumentation subroutines are computer-readable, computer-executable programmatic manifestations of the instrumentation policy, i.e., either a rate limit-based instrumentation policy, or a temporal correlation-based instrumentation policy, or a combination of both the rate limit-based instrumentation policy and temporal correlation-based instrumentation policy. Preferably, the kernel-executable instrumentation subroutines embody eBPF bytecodes usable for instrumenting the corresponding kernel system calls, based on the underlying kernel system call parameters (also referred to as process-related parameters). Preferably, the kernel-executable instrumentation subroutines embodying relevant eBPF bytecodes are automatically loaded onto the kernel space 204A in response to the triggering of the corresponding kernel system call. Subsequently, the kernel-executable instrumentation subroutines are executed by the processor 202 in line with the parameters underlying the corresponding kernel system calls, and the kernel system calls are monitored for any variations in predefined rate limits and temporal correlations, i.e., any violation of the pre-defined rate limit-based rules and temporal correlation-based rules.

In accordance with the present disclosure, every kernel-executable instrumentation subroutine is activated from a hookpoint, which, in turn, acts as the start point for the execution of the bytecode embodied within the kernel-executable instrumentation subroutine. Further, each kernel-executable instrumentation subroutine also incorporates context-oriented parameters describing at least the context of execution of the corresponding kernel system call. For example, a preferred kernel-executable instrumentation subroutine may describe a policy that allows a particular kernel system call to be executed with certain predetermined parameters at a rate of 20 times per second. And the kernel-executable instrumentation subroutine could be configured to generate a diagnostic alert message and associate a predetermined severity level with the said kernel system call if the said kernel system call is executed at a rate that exceeds the 20 times per second limit.

Also, in a preferred embodiment of the present disclosure, the kernel-executable instrumentation subroutines are also programmed to block the execution of kernel system calls that have been determined by the processor 202 as violating the predefined rate limit-based rules and temporal correlation-based rules embodied with the said kernel-executable instrumentation subroutines. In accordance with the present disclosure, the rate limit-based policy and the temporal correlation-based policy embodied in a kernel-executable instrumentation subroutine also envisage the use of wildcards. Preferably, wildcard characters are used, inter-alia, while specifying the names of the processes initiating a kernel system call and the parameters applicable to the said kernel system call. In accordance with the present disclosure, it is possible that the paths of the processes are specified using wildcard-based patterns, in addition to the parameters applicable to the execution of the kernel system calls invoked by the said processes. For instance, the names and paths of the processes that trigger the kernel system call 'readdir' could be specified using wildcard-based patterns.

Further, it is also possible that the parameters applicable to the 'readdir' kernel system call, i.e., an IP4 address, could also be specified using a wildcard-based pattern. However, it is well-known that a typical implementation of wildcards in eBPF involves multiple looping constructs and complex syntax. And therefore, the present disclosure envisages the processor 202 as generating context-specific, specialized kernel-executable instrumentation subroutines that would work within the context of only the corresponding wildcard-based patterns. That is, if either an exemplary rate limiting-based policy or a temporal correlation-based policy incorporates a wildcard pattern '*/bash', then the processor 202 generates a kernel-executable instrumentation subroutine that is applicable only for the said wildcard-based pattern.

Further, in accordance with the present disclosure, the context-specific, specialized kernel-executable instrumentation subroutine generated with respect of the wildcard-based pattern '*/bash' would never work for other different wildcard-based patterns. In accordance with the present disclosure, for every rate limit-based policy and a temporal correlation-based policy incorporating wildcard-based patterns, a specialized, exclusive, and context-specific kernel-executable instrumentation subroutine is generated, thereby obviating the well-known drawbacks associated with implementing generic wildcard matching in the kernel space 204A by using conventional eBPF-based instruction set.

Referring to FIG. 3, there is shown a flowchart illustrating the steps involved in the computer-implemented method for facilitating in-kernel instrumentation of kernel-level events. The execution of the method begins at step 300 when the processor 202 segregates the virtual memory module 204 into kernel space 204A and user space 204B, with the kernel space 204A reserved for executing the kernel and kernel extensions, and the user space reserved for executing user applications. Preferably, the user applications executing within the user space 204B of the virtual memory 204 rely on kernel system calls to trigger certain requests that are to be facilitated only by the kernel and ostensibly within the kernel space 204A, and within the kernel protection domain that entails highest access privileges.

In accordance with the present disclosure, the processor 200 is configured to access both the kernel space 204A and the user space 204B, and communicate with both kernel-level processes (i.e., processes executed at the kernel-level) and the user applications executing within the user space 204B. In accordance with the present disclosure, at step 302, the processor 202 implements an extended Berkley Packet filter (eBPF) kernel module 206 within the kernel space 204A of the computer-implemented system 200 and triggers the eBPF kernel module 206 to generate an 'eBPF process filter map,' 'eBPF event map,' 'eBPF task map,' and 'eBPF probes map,' within the kernel space 204A. Preferably, the 'eBPF process filter map' is created by the eBPF kernel module 206 when the kernel boots up and the 'eBPF event map,' 'eBPF task map,' and 'eBPF probes map' are created by the eBPF kernel module 206 when a process executing in the user space 204B enters the kernel space 204A with the intention of triggering a kernel system call to avail predetermined kernel services.

As discussed hitherto, a system call is spanned within the kernel space 204A when a process executing in the user space 204B enters the kernel space 204A and requests the kernel to perform a predetermined operation (for example, memory read/write operation or input/output operation) on its behalf. In accordance with the present disclosure, the invocation of a kernel system call within the kernel space 204A by a process is construed as a kernel-level event. One of the objectives of the computer-implemented method, as discussed earlier, is to perform an in-kernel instrumentation of the kernel system call, including any kernel-level functions that may be triggered or spanned by the kernel system call, entirely within the kernel space 204A, without necessitating any context-switches to the user space 204B and without necessitating sharing of any kernel-level information with the user space 204B, at least within the context of the instrumentation of the kernel system call, and thereby determine, within the kernel space 204A, if the user space process that triggered the kernel system call is legitimate or malicious.

In accordance with the present disclosure, subsequent to the invocation of a kernel system call by a process executing within the user space, the processor 202, at step 304, consults the 'eBPF process filter map' created by the eBPF kernel module 206. The 'eBPF process filter map' incorporates a mapping between a plurality of process paths from which processes can be invoked and the possible events that may be spanned by such processes invoked from the said process paths. In accordance with the present disclosure, the 'eBPF process filter map' is populated when the kernel boots up. Preferably, 'eBPF process filter map' includes a one-to-one mapping between a plurality of process paths from which processes can be invoked and a plurality of kernel-level events that could be triggered by the processes invoked from the said plurality of process paths.

In accordance with the present disclosure, whenever a process executing in the user space 204B enters the kernel space 204A, the processor 202 determines the path from which the said process was invoked. Subsequently, when the process that entered the kernel space 204A triggers a kernel system call, the processor 202 consults the 'eBPF process filter map' and determines if the 'process path-kernel system call' pair corresponding to the process that entered the kernel space 204A is incorporated in the 'eBPF process filter map'. For example, if the process that entered the kernel space 204A was invoked from the process path '*/nginx' and if the process triggered the 'write' kernel system call, then the processor 202, based on a consultation with the 'eBPF process filter map' determines the said process to be positively matching an entry in the 'eBPF process filter map,' if the said 'process path-kernel system call' pair was also available as an entry in the 'eBPF process filter map.'

In accordance with the present disclosure, if the 'process path-kernel system call' pair corresponding to a process that entered the kernel space 204A matches with any corresponding entry in the 'eBPF process filter map' then the processor 202 decides to initiate an in-kernel instrumentation of such a process. The processor 202 is pre-programmed to initiate an in-kernel instrumentation of any process that enters the kernel space 204 and embodies a 'process path-kernel system call' pair matching an entry in the 'eBPF process filter map.'

In accordance with the present disclosure, when a process that entered the kernel space 204A is determined, by the processor 202, as embodying a 'process path-kernel system call' pair matching an entry in the 'eBPF process filter map,' then the processor 202 elicits at least a unique process ID (PID), a unique process namespace ID (PID, ns), and an event pointer corresponding to such a process. Subsequently, at step 306, the processor 202 triggers the eBPF kernel module 206 to create an 'eBPF task map' within the kernel space 204A and populate the 'eBPF task map' with a new entry that includes at least the unique process ID (PID), the unique process ID_namespace (PID_ns), and the event pointer corresponding to the process that entered the kernel space 204A and embodied a 'process path-kernel system call' pair matching an entry in the 'eBPF process filter map.'

In accordance with the present disclosure, subsequent to triggering the eBPF kernel module 206 to create the 'eBPF task map' and populate the 'eBPF task map' with the process ID (PID), the process ID_namespace (PID_ns), and the event pointer corresponding to the process that entered the kernel space 204A and embodied a 'process path-kernel system call' pair matching an entry in the 'eBPF process filter map,' the processor 202 triggers the eBPF kernel module 206 to create an 'eBPF event map,' at step 308. The 'eBPF event map' created by the eBPF kernel module 206 includes, for every process listed within the 'eBPF task map,' the kernel system calls likely to be invoked by the said process. Preferably, the eBPF kernel module 206 programmatically consults the 'eBPF process filter map' and the 'eBPF task map' to identify the processes that entered the kernel space 204A and the kernel system calls likely to be triggered by each of the said processes that entered the kernel space 204A. Preferably, the 'eBPF event map' describes, for every process (identified either by the unique PID or unique PID_ns or both, in the 'eBPF task map), the kernel system calls invoked by the said process and the parameters for each of the kernel system calls invoked by the said process. Within the 'eBPF event map,' the processor 202 maps the kernel system calls invoked by the said process and the parameters embodied within the kernel system calls.

In accordance with the present disclosure, the processes incorporated within in the 'eBPF task map' are interlinked, by the eBPF kernel module 206, with the 'kernel system calls' described in the 'eBPF event map' such that for every process described in the 'eBPF task map', there exists a corresponding 'kernel system call' in the 'eBPF event map'. In accordance with an exemplary embodiment of the present disclosure, both the 'eBPF task map' and 'eBPF event map' are configured by the eBPF kernel module 206 to maintain a list of 'PIDs' and 'PID_ns' identifying the corresponding processes even though the present disclosure illustrates, only for the sake of explanation, the 'PIDs' and 'PID_ns' to be apart of only the 'eBPF task map'. In accordance with the exemplary embodiment of the present disclosure, the 'PID' or the 'PID_ns' could be used as a primary key within the 'eBPF task map' and as a foreign key within the 'eBPF event map' such that every process identified by a corresponding 'PID' and/or 'PID_ns' in the 'eBPF task map' is associated with a corresponding 'kernel system call' listed within the 'eBPF event map'. Typically, the process ID (PID) and the process namespace ID (PID_ns) is unique to every process, and therefore the processor 202 utilizes either the process ID (PID) or the process namespace ID (PID_ns) as a primary key and arranges the entries within the 'eBPF task map.' such that within the 'eBPF task map' every process is uniquely identified based on either the process ID (PID) or the process namespace ID (PID_ns).

As discussed hitherto, the 'eBPF event map' describes, for every process (identified either by the unique PID or unique PID_ns or both, in the 'eBPF task map), the system calls invoked by the process, the kernel system call parameters for each of the kernel system calls invoked by the process. Essentially, when a process executing within the user space 204B enters the kernel space 204A, the processor 202 consults the 'eBPF process filter map' and identifies the path corresponding to the said process. Subsequently, from the 'eBPF process filter map,' the processor 202 determines the possible kernel-level events, i.e., kernel system calls, likely to be invoked by the said process. Subsequently, the processor 202 triggers the eBPF kernel module 206 to create an 'eBPF task map' within the kernel space 204A and to populate the 'eBPF task map' with at least the process ID (PID) and process namespace ID (PID_ns) corresponding to the said process, i.e., the process that entered the kernels space 204A. Subsequently, the processor 202 triggers the eBPF kernel module to create an 'eBPF event map' within the kernel space 204A and to populate the 'eBPF event map' with at least the kernel system calls likely to be invoked by the said process (i.e., the process that entered the kernels space 204A, and was identified by the corresponding process ID (PID) and process namespace ID (PID_ns) within the 'eBPF task map') and the kernel system call parameters (also referred to as process-related parameters) corresponding to the said kernel system calls. Preferably, the information directed to the kernel system calls likely to be invoked by the said process could be derived from the 'eBPF process filter map' that incorporates the path corresponding to every process that enters the kernel space 204A and the kernel-level events (i.e., kernel system calls) that could be triggered by the said processes invoked from the said paths. The processor 202 interlinks the said process that entered the kernel space 204A (identified by the process ID and process namespace ID in the 'eBPF task map) with the kernel system calls likely to be triggered by the said process and the corresponding kernel system call parameters, based on either the process ID or the process namespace ID stored as a primary key in the 'eBPF task map' and as a foreign key in the 'eBPF event map.'

In accordance with the present disclosure, when the process that entered the kernel space 204A triggers a kernel system call specified in the 'eBPF event map.' the processor 202, at step 310, programmatically consults an 'eBPF probes map' pre-generated by the eBPF kernel module 206 within the kernel space 204A. Preferably, the 'eBPF probes map' incorporates a list of kernel-level events, i.e., a list of kernel system calls, likely to be triggered by the processes entering the kernel space 204A, a list of kernel-executable instrumentation subroutines that are to be executed within the kernel space 204A as a response to the triggering of the corresponding listed kernel-level events, and the bytecode pointers pointing to the corresponding kernel-executable instrumentation subroutines stored within the user space 204B.

In accordance with the present disclosure, the processor 202 programmatically consults the 'eBPF task map' and uniquely identifies every process that enters the kernel space 204A. Likewise, the processor 202 programmatically consults the 'eBPF event map' and identifies the kernel system calls and kernel system call parameters corresponding to every process that enters the kernel space 204A. Likewise, the processor 202 programmatically consults the 'eBPF probes map' and identifies the kernel-executable instrumentation subroutines that are to be executed within the kernel space 204A in response to the triggering of the kernel system calls by every process that enters the kernel space 204A.

In accordance with an exemplary embodiment of the present disclosure, the kernel system call names (or kernel-level event names) stored within the 'eBPF event map' function as a primary key. Likewise, the kernel system call names (or kernel-level event names) stored within the 'eBPF probes map' function as a foreign key' such that every kernel system call identified by a corresponding kernel system call name within the 'eBPF event map' is associated with a corresponding bytecode pointer stored in the 'eBPF probes map' and linked to a corresponding kernel-executable instrumentation subroutine. In this manner, every kernel system call or kernel-level event specified in the 'eBPF event map' is programmatically linked to the corresponding bytecode pointers stored within the 'eBPF probes map,' such that the kernel-executable instrumentation subroutines pointed to by the respective bytecode pointers are executed within the kernel space 204A when the corresponding kernel system calls are triggered by the processes identified in the 'eBPF task map' and the 'eBPF event map.'

In accordance with the present disclosure, whenever a process that enters the kernel space 204A triggers a kernel system call, the processor 202 programmatically consults the 'eBPF probes map' and identifies the kernel-executable instrumentation subroutine that has to be executed within the kernel space 204A to instrument the triggered kernel system call. In accordance with the present disclosure, when the said process (i.e., the process that entered the kernel space 204A and is listed in the 'eBPF task map') triggers a kernel system call (i.e., the kernel system call specified in the 'eBPF event map') from the kernel space 204A, the process 202 recognizes the triggering of the said kernel system call by the said process. The processor 202 programmatically consults the 'eBPF probes map' and loads into the kernel space 204A, the kernel-executable instrumentation subroutine linked, within the 'eBPF probes map,' to the said kernel system call invoked by the said process. The processor 202 subsequently triggers the execution of the loaded kernel-executable instrumentation subroutine within the kernel space 204A, and thereby instruments the said kernel system call triggered by the said process, within the kernel space 204A (step 312).

The processor 202, at step 314, subsequently generates a diagnostic message, categorizing the said process that invoked the said kernel system call as either authentic or malicious, based on the in-kernel instrumentation of the said kernel system call, and further based on the compliance exhibited by the said process to the rate limit-based rules and temporal correlation-based rules embodied within the kernel-executable instrumentation subroutine that instrumented the said process. Preferably, the diagnostic alert message is pushed from the kernel space 204A onto an input/output device, for example, a display monitor (not shown in figures) of the computer-implemented system 200 for display thereon, and for the perusal of a system administrator.

TECHNICAL ADVANTAGES

The technical advantages envisaged by the present disclosure include the realization of a computer-implemented system, computer-implemented method, and computer program product that facilitate in-kernel instrumentation and auditing of kernel-level processes or events, and thus do not rely upon the user space for performing any instrumentation and auditing-related tasks. Further, since kernel-level processes are instrumented and audited at the kernel-level itself, context-switches between the user space and the kernel space, at least within the context of the instrumentation and auditing of kernel-level events is eliminated or at the least minimized, thereby consequentially minimizing the processing-related overheads and memory operations-related overheads typically associated with instrumenting and auditing kernel-level processes at the user space, or within the user-level. The computer-implemented system, method, and computer program product are configured to reduce processing-related overheads and memory operations-related overheads by employing selective instrumentation and auditing of kernel-level processes. Further, selective instrumentation and auditing of kernel-level processes also ensures that additional control-related overheads are significantly reduced, since certain kernel-level processes deemed non-critical are not considered for instrumentation and auditing, and the directives corresponding to instrumentation and auditing of kernel-level processes are applied only upon kernel-level processes deemed critical and important.

Further, to ensure minimal memory-related overheads control-related overheads while executing kernel-level processes that have not been explicitly linked with any instrumentation subroutines, the system, method, and computer program product are configured to perform, at the maximum, a single look-up of the eBPF maps storing the kernel-level processes-related information and instrumentation-related directives, thereby bringing down the quantum of computing resources utilized during the execution of such kernel-level processes not linked to any kernel-executable instrumentation-related directives. Likewise, if certain kernel-level processes are determined as embodying non-critical process contexts, then even in the case of such kernel-level processes embodying non-critical process contexts, the system, method, and computer program product are configured to perform, at the maximum, a single look-up of the eBPF maps, thereby bringing down the quantum of computing resources utilized during the execution of such non-critical kernel-level processes. Further, in accordance with the present disclosure, the kernel-executable instrumentation-related directives are adapted to be applied selectively to predetermined kernel-level processes, thus not essentially necessitating a blanket instrumentation and auditing of every kernel-level process. Further, kernel-executable instrumentation-related directives are programmed in such a way that they describe instrumentation-related constructs strictly in line with the pre-requisites associated with the kernel-executable eBPF instruction set governing the implementation of eBPF maps that store, at the kernel level, the kernel-level process-related information and pointers directed to the said kernel-executable instrumentation-related directives.

What is claimed is:

1. A computer-implemented system comprising:
    a memory module divided into kernel space and user space;
    a processor communicably coupled to said memory module, said processor configured to perform an in-kernel instrumentation of processes executed within said kernel space, said processor configured to:
        execute an extended Berkley Packet Filter (eBPF) kernel module within said kernel space and trigger said eBPF kernel module to create at least one mapping table within said kernel space, and further trigger said eBPF kernel module to populate said mapping table with a mapping between at least process-related parameters, process contexts, kernel-level events corresponding to each of said processes executable within said kernel space, and a plurality of bytecode pointers, wherein each of said bytecode pointers point to corresponding kernel-level instrumentation subroutines executable within said kernel space, each of said kernel-level instrumentation subroutines configured to instrument a corresponding process executable within said kernel space;
        on invocation of at least one process within said kernel space, perform a look-up of said mapping table using at least one of said process contexts and kernel-level events corresponding to invoked process, and identify from said mapping table a bytecode pointer mapped to said at least one of said process contexts and kernel-level events corresponding to said invoked process;
        execute a filtering process within said kernel space and thereby match, within said kernel space, at least said process-related parameters mapped to said invoked process, with predefined rules embodied within a kernel-level instrumentation subroutine pointed to by said bytecode pointer; and
        on finding a match, execute said kernel-level instrumentation subroutine pointed to by said bytecode pointer within said kernel space, and thereby instrument said invoked process within said kernel space in accordance with said predefined rules embodied within said kernel-level instrumentation subroutine;
    and wherein said processor is configured to minimize context-switching between said kernel space and said user space by executing said kernel-level instrumentation subroutine entirely within said kernel space and by restricting an information flow corresponding to instrumentation of said invoked process to said kernel space.

2. The system as claimed in claim 1, wherein said kernel-level instrumentation subroutines are stored in said user space, and wherein said processor is configured to execute said kernel-level instrumentation subroutine pointed to by said bytecode pointer within said kernel space, only in an event said process-related parameters mapped to said invoked process match with said predefined rules embodied within said kernel-level instrumentation subroutine.

3. The system as claimed in claim 1, wherein at least some of said kernel-level instrumentation subroutines are preconfigured to be specifically applicable to predetermined wildcard patterns embodied within said process-related parameters corresponding to at least some of said processes executable within said kernel space.

4. The system as claimed in claim 1, wherein said predefined rules embodied within said kernel-level instrumentation subroutine include rate limit-based rules and temporal correlation-based rules, and wherein said processor instruments said invoked process within said kernel space by implementing at least one of said rate limit-based rules and temporal correlation-based rules within said kernel space, and thereby restricts said information flow corresponding to instrumentation of said invoked process to said kernel space.

5. The system as claimed in claim 2, wherein said processor is further configured to insert said kernel-level instrumentation subroutine at a pre-defined hookpoint embodied within said invoked process executing within said kernel space, said processor configured to identify said hookpoint based on activation of a corresponding probes pre-inserted into said invoked process.

6. A computer-implemented method for performing in-kernel instrumentation of processes executed on a kernel space of a computer-based system embodying at least one processor and a memory module, said method comprising the following computer-implemented steps:
    triggering said processor to programmatically divide said memory module into said kernel space and user space;
    triggering said processor to execute an extended Berkley Packet Filter (eBPF) kernel module within said kernel space;
    configuring, by said processor, said eBPF kernel module to create at least one mapping table within said kernel space and to populate said mapping table with a mapping between at least process-related parameters, process contexts, kernel-level events corresponding to each of said processes executable within said kernel space, and a plurality of bytecode pointers, wherein each of said bytecode pointers point to corresponding kernel-level instrumentation subroutines executable within said kernel space, each of said kernel-level instrumentation subroutines configured to instrument a corresponding process executable within said kernel space;
    on invocation of at least one process within said kernel space, triggering said processor to perform a look-up of said mapping table using at least one of said process contexts and kernel-level events corresponding to invoked process, and to identify from said mapping table, a bytecode pointer mapped to said at least one of said process contexts and kernel-level events corresponding to said invoked process;

triggering said processor to execute a filtering process within said kernel space and thereby match, within said kernel space, said process-related parameters mapped to said invoked process, with predefined rules embodied within a kernel-level instrumentation subroutine pointed to by said bytecode pointer; and on finding a match, triggering said processor to execute said kernel-level instrumentation subroutine pointed to by said bytecode pointer within said kernel space, and thereby instrument said invoked process within said kernel space in accordance with said predefined rules embodied within said kernel-level instrumentation subroutine;

and wherein said method further includes a step of minimizing context-switching between said kernel space and said user space by executing said kernel-level instrumentation subroutine entirely within said kernel space and by restricting an information flow corresponding to instrumentation of said invoked process to said kernel space.

7. The method as claimed in claim 6, wherein the method further includes a step of storing said kernel-level instrumentation subroutines in said user space, and executing said kernel-level instrumentation subroutine pointed to by said bytecode pointer within said kernel space, only in an event said process-related parameters mapped to said invoked process match with said predefined rules embodied within said kernel-level instrumentation subroutine.

8. The method as claimed in claim 6, wherein the method further includes a step of pre-configuring, by said processor, at least some of said kernel-level instrumentation subroutines to be specifically applicable to corresponding predetermined wildcard patterns embodied with said process-related parameters corresponding to at least some of said processes executable within said kernel space.

9. The method as claimed in claim 6, wherein said predefined rules embodied within said kernel-level instrumentation subroutine include rate limit-based rules and temporal correlation-based rules, and wherein the method further includes a step of instrumenting said invoked process within said kernel space by executing at least one of said rate limit-based rules and temporal correlation-based rules within said kernel space.

10. The method as claimed in claim 7, wherein the method further includes a step of inserting said kernel-level instrumentation subroutine at a pre-defined hookpoint embodied within said invoked process, and identifying, by said processor, said hookpoint based on activation of a corresponding kprobe pre-inserted into said invoked process.

11. A non-transitory computer-readable storage medium having computer-executable instructions stored thereon, said computer-executable instructions when executed by a computer processor embodied within a computer-based system, cause said computer processor to:

programmatically divide a memory module embodied within said computer-based system into kernel space and user space;

execute an extended Berkley Packet Filter (eBPF) kernel module within said kernel space, and trigger said eBPF kernel module to create at least one mapping table within said kernel space, and further trigger said eBPF kernel module to populate said mapping table with a mapping between at least process-related parameters, process contexts, kernel-level events corresponding to each of a plurality of processes executable within said kernel space, and a plurality of bytecode pointers, each of said bytecode pointers pointing to corresponding kernel-level instrumentation subroutines executable within said kernel space, each of said kernel-level instrumentation subroutines configured to instrument a corresponding process executable within said kernel space;

on invocation of at least one process within said kernel space, perform a look-up of said mapping table using at least one of said process contexts and kernel-level events corresponding to invoked process, and identify from said mapping table a bytecode pointer mapped to at least one of said process contexts and kernel-level events corresponding to said invoked process;

execute a filtering process within said kernel space and thereby match, within said kernel space, said process-related parameters mapped to said invoked process, with predefined rules embodied within a kernel-level instrumentation subroutine pointed to by said bytecode pointer; and on finding a match, execute said kernel-level instrumentation subroutine pointed to by said bytecode pointer within said kernel space, and thereby instrument said invoked process within said kernel space in accordance with said predefined rules embodied within said kernel-level instrumentation subroutine;

and wherein said computer-executable instructions, when executed by said processor, minimize context-switching between said kernel space and said user space by causing said kernel-level instrumentation subroutine to be executed entirely within said kernel space and by restricting an information flow corresponding to instrumentation of said process to said kernel space.

12. The computer-executable instructions as claimed in claim 11, wherein said computer-executable instructions, when executed by said processor, further cause said processor to:

store said kernel-level instrumentation subroutines in said user space;

execute said kernel-level instrumentation subroutine pointed to by said bytecode pointer within said kernel space, only in an event said process-related parameters mapped to said invoked process match with said predefined rules embodied within said kernel-level instrumentation subroutine;

insert said kernel-level instrumentation subroutine at a pre-defined hookpoint embodied within said invoked process executing within said kernel space, and identify said hookpoint based on activation of a corresponding kprobe pre-inserted into said invoked process;

pre-configure at least some of said kernel-level instrumentation subroutines to be applicable to corresponding predetermined wildcard patterns embodied with said process-related parameters corresponding to at least some of said processes executable within said kernel space; and instrument said invoked process within said kernel space by implementing said predefined rules embodied within said kernel-level instrumentation subroutine, and wherein said predefined rules include at least rate limit-based rules and temporal correlation-based rules.

* * * * *

UNITED STATES PATENT AND TRADEMARK OFFICE
CERTIFICATE OF CORRECTION

| | | |
|---|---|---|
| PATENT NO. | : 12,242,629 B2 | Page 1 of 1 |
| APPLICATION NO. | : 17/941938 | |
| DATED | : March 4, 2025 | |
| INVENTOR(S) | : Rahul Arvind Jadhav, Jaehyun Nam and Seungsoo Lee | |

It is certified that error appears in the above-identified patent and that said Letters Patent is hereby corrected as shown below:

On the Title Page

Item (60) the related application information should appear as follows:
RELATED U.S. APPLICATION DATA
Provisional application No. 63/242,452, filed on September 9, 2021.

Signed and Sealed this
Twelfth Day of August, 2025

Coke Morgan Stewart
*Acting Director of the United States Patent and Trademark Office*